United States Patent [19]

Park

[11] Patent Number: 5,111,590

[45] Date of Patent: May 12, 1992

[54] MEASURING METHOD OF MACHINE TOOL ACCURACY USING A COMPUTER AIDED KINEMATIC TRANSDUCER LINK AND ITS APPARATUS

[76] Inventor: Joon-ho Park, 13-803 Woosung Apt, Chamsilbondong, Songpaku, Seoul, Rep. of Korea

[21] Appl. No.: 526,266

[22] Filed: May 21, 1990

[30] Foreign Application Priority Data

May 23, 1989 [KR] Rep. of Korea .................... 89-6892

[51] Int. Cl.$^5$ ............................................. G01C 25/00
[52] U.S. Cl. ........................................ 33/502; 33/613; 73/1 J
[58] Field of Search ................. 33/502, 503, 504, 505, 33/558, 561, 613, 626, 550, 572, 536, 538, 567; 364/571.01, 571.02, 571.03; 73/1 J; 408/147

[56] References Cited

U.S. PATENT DOCUMENTS

| | | |
|---|---|---|
| 3,886,666 | 6/1975 | Thompson et al. .................... 33/505 |
| 3,916,173 | 10/1975 | Williams, Jr. et al. ......... 364/571.02 |
| 4,435,905 | 3/1984 | Bryan ............................. 33/DIG. 1 |
| 4,437,151 | 3/1984 | Hurt et al. .............................. 33/503 |
| 4,533,823 | 8/1985 | Vittorio . |
| 4,543,732 | 10/1985 | Maples ................................... 33/502 |
| 4,558,506 | 12/1985 | Kielma . |
| 4,716,657 | 1/1988 | Collingwood ........................ 33/561 |
| 4,775,947 | 10/1988 | Marron ................................. 33/550 |
| 4,777,818 | 10/1988 | McMurtry ............................ 33/503 |
| 4,831,743 | 5/1989 | Struble ................................. 33/561 |

*Primary Examiner*—William A. Cuchlinski, Jr.
*Assistant Examiner*—C. W. Fulton
*Attorney, Agent, or Firm*—Woodcock Washburn Kurtz Mackiewicz & Norris

[57] ABSTRACT

This invention is a computer aided kinematic transducer link system with associated software for the assessment of contouring accuracy of N.C. machine tools, which have been developed and evaluated by testing of various N.C. machine tools. The invention relates to a system for the assessment of contouring accuracy of N.C. machine tools by using a computer aided kinematic transducer link system, and to a method for analysis and evaluation of different sources of machine tool errors. The design of the measuring system is based upon a pseudo kinematic link which orients two displacement transducers between two master spheres and moves in a circular path. Since it is computer aided, the errors during contouring motion are automatically recorded and the analysis for complete circular profiles and partial arcs is carried out using a least squares criterion. The present computer aided assessment system is designed for the measurement of contour motion accuracy and analysis of error origin of N.C. machine tools. By the systematic application of the system, the deviations resulting from the geometry of the machine, the drives or the numerical control system can be defined. The system is also used to assess the geometrical deformation due to thermally induced errors or load induced errors between the workpiece and tool position.

6 Claims, 44 Drawing Sheets

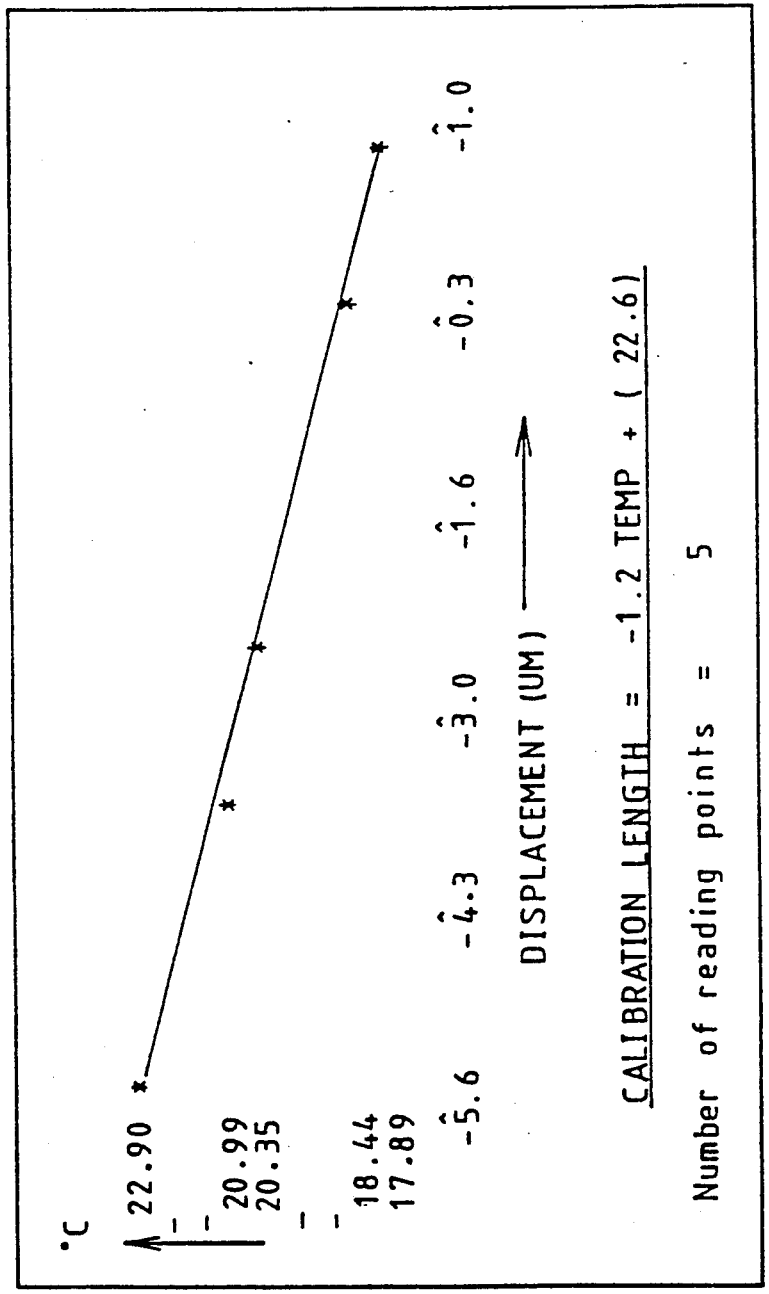

CONTOUR PATH OF NC PROGRAM

BASIC PROFILE TEST : POSITION 1, 2, 3
GEOMETRY CHECK TEST : POSITION 1, 2, 3, 5, 6, 7
NC CHECK TEST : POSITION 4
FLATNESS TEST : POSITION 5, 8

FLATNESS TEST RESULT    (TEST SERIES No. F221)

EQUATION of LEAST SQUARE PLANE (x-y plane):
   z  = 0.00111187 + (-0.00007967) x + (0.00001525) y $\alpha z$ = 0.004647°
   $\alpha x$ = 90.004565°
   $\alpha y$ = 89.999127° max. error (um) = 15.6,    min. error (um) = -14.3

No. of Sampling = 361
Out of Flatness = 30.0 um

FLATNESS TEST : x,y plane        SERIES No. F 221

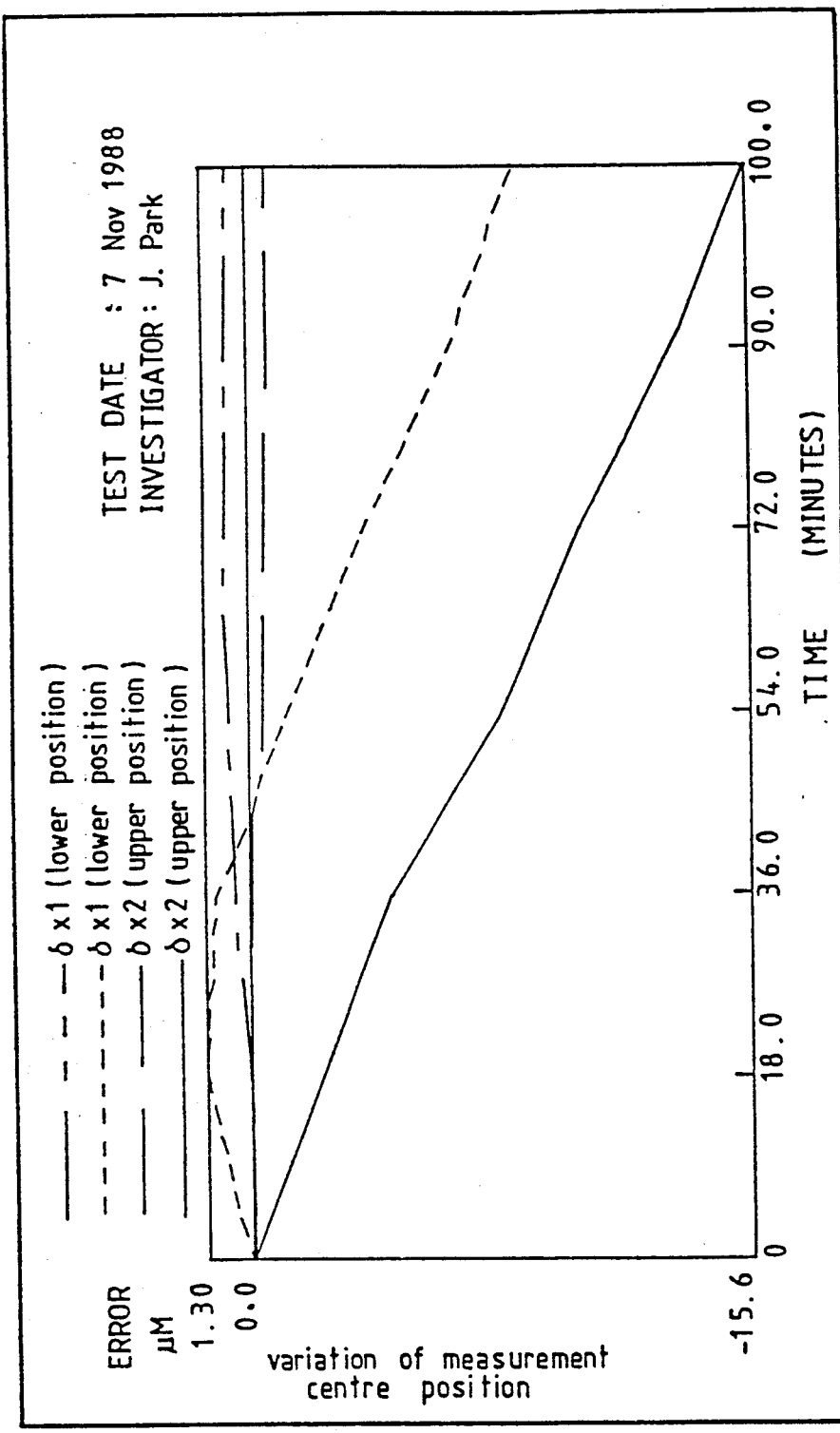

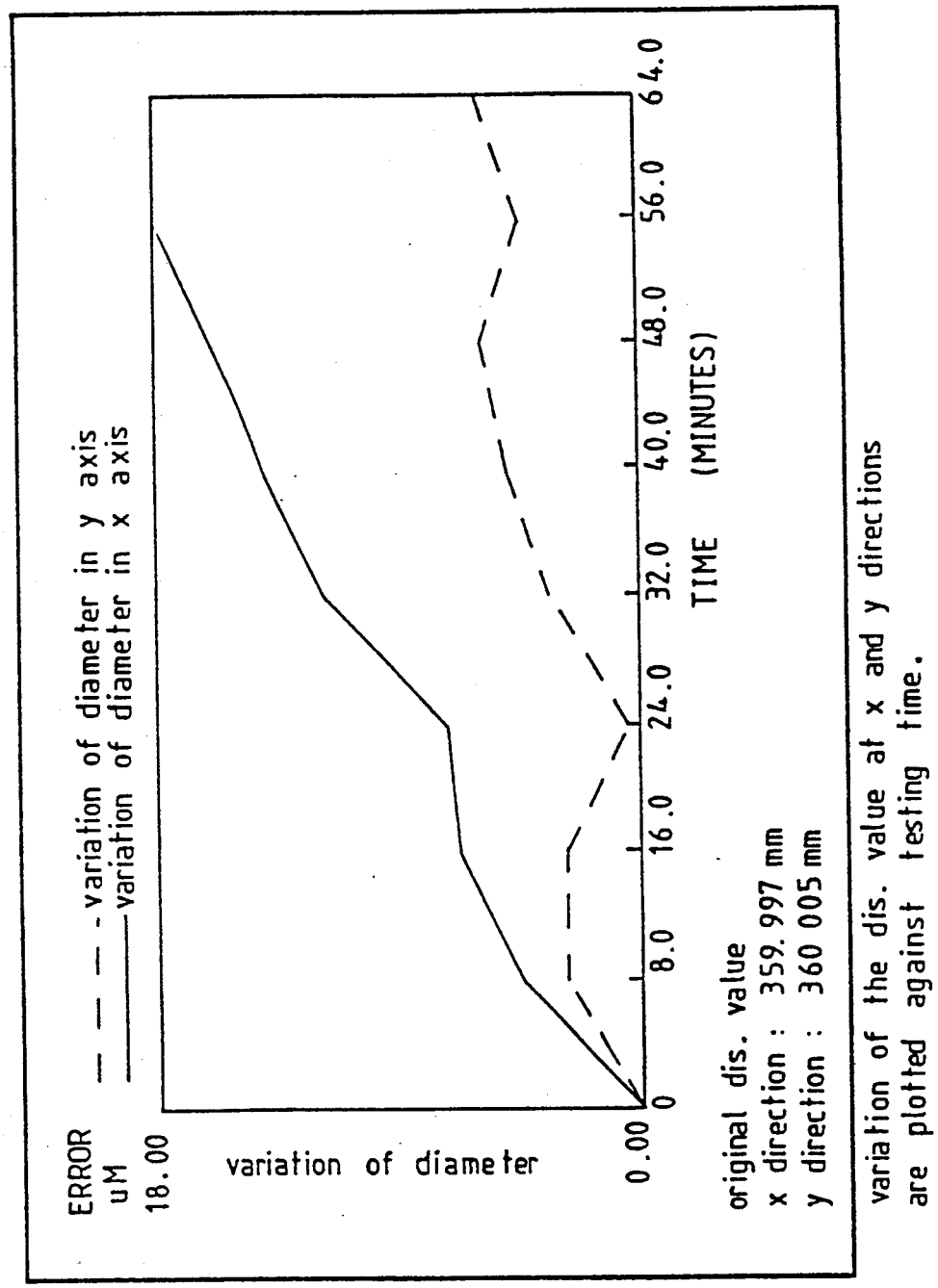

MEASURING METHOD OF MACHINE TOOL ACCURACY USING A COMPUTER AIDED KINEMATIC TRANSDUCER LINK AND ITS APPARATUS

BACKGROUND OF THE INVENTION

The present invention relates to a system for the assessment of accuracy of N.C. (Numerically Controlled) machine tools. The accuracy of a workpiece produced by N.C. machine tools is influenced by many factors such as deviations caused by inaccurate geometry and errors caused by vibrations, load, handling, maintenance and environmental effect. With contouring operations, the characteristics of the feed drives and control systems also contribute to workpiece accuracy.

To assess the N.C. machine tool accuracy, both direct and indirect test methods can be undertaken, the direct approach necessitating the machining of a component or test piece followed by the measurement and evaluation of its geometry. This direct approach is generally confined to relatively small components whereas the indirect approach using some form of instrumentation in conjunction with artefacts is particularly useful for the assessment and evaluation of the geometry over the operating volume of the machine.

The present invention uses the indirect method for checking specified tolerances and sources of N.C. machine tool errors and also can be used as an aid for diagnosis of the machine tool's accuracy. Namely, the invention relates to a system for the assessment of contouring accuracy of N.C. machine tools by using a computer aided kinematic transducer link system and to a method for analysis and evaluation of different sources of machine tool errors.

SETTING OF THE INVENTION

The conventional circular test methods can provide some information on the control and drive system as well as geometrical errors of N.C. machine tools. However, the full potential of assessment of machine tool accuracy will not be realized until a more practical and commercially viable system is available. Therefore, it was necessary to develop a new computer aided system for the assessment of N.C. machine tool accuracy in order to achieve a more practical and commercially viable means of determining and analyzing the error during a contouring operation on a machine tool.

The present computer aided assessment system (hereinafter 'JP System' or 'Contisure')is designed for the measurement of contour motion accuracy and analysis of error origin of N.C. machine tools. To analyze the error source of contour motion, the influence of various N.C. machine tool errors on contour paths are investigated and characteristic error patterns of different errors are analyzed.

Two different types of contour test programs are developed for actual testing of N.C. machine tools, and first, 'Basic profile test', a simple quick test program of contour motion to check the contouring accuracy of N.C. machine tool, secondly, a 'Composite test', a comprehensive and complete check program of contour motion for three axes and analysis of the machine tool error source from geometry and N.C. and drives of machine tools are developed. Using these computer aided test programs, the origins of different errors of the contouring motion in various N.C. machine tools such as lathes, turning centre, etc. under different duty cycles are investigated, and the source of errors is analyzed.

OBJECTIVES OF THE INVENTION

It is an objective of the present invention to provide a more practical and commercially viable means of determining and analyzing the errors of the machine during contouring operations.

Another objective of the invention is to provide a contouring error analysis method, including the thermal deformation of the machine and its influence on the accuracy of components. A further objective is to provide a system by applying software for the automatic recording and evaluation of the contouring assessment.

These and other objectives, as well as other advantages, are attained by the present invention and described hereinafter in conjunction with the accompanying drawings.

SUMMARY OF THE INVENTION

The foregoing objectives are achieved using a computer aided kinematic transducer link system with associated software for the assessment of contouring accuracy of N.C. machine tools which have been developed and evaluated by testing of various N.C. machine tools.

The design of the measuring system is based upon a pseudo kinematic link which orients two displacement transducers between two master spheres which move in a circular path. Since it is computer aided, the invention automatically records errors during contouring motion and the analysis for complete circular profiles and partial arcs is carried out using a least squares criterion.

This system can be used for checking the N.C. machine errors and as an aid for diagnosis of the machine tool accuracy. By the systematic application of the system, the deviations resulting from the geometry of the machine, the drives or the numerical control system can be defined. The system is also used to assess the geometrical deformation due to thermally induced errors or load induced errors between the workpiece and tool position.

BRIEF DESCRIPTION OF THE DRAWINGS

FIG. 11 shows a calibration of ambient temperature influence on the kinematic transducer link and setting fixture.

FIG. 27 shows thermal distortion of structure due to spindle rotation.

DETAILED DESCRIPTION OF THE INVENTION

The main factors which contribute to the accuracy of N.C. machine tools can be classified into several categories: quasi-static errors such as geometric errors, static loading induced errors, and thermally induced errors; geometry processing in N.C. and feed-drive system error caused by N.C. interpoloation and incorrect performance of the drives and the numerical control; and dynamic loading error and vibrations. However, the final accuracy of a machine workpiece in size, in form, in position, and in orientation is also affected by other factors such as the process of production, the operator, handling, the workpiece itself, and environment. A computer aided kinematic transducer link system, named 'JP system', thus have been developed for assessing the contouring capabilities, including geometric errors and N.C. and drive system errors of N.C. machine tools such as machining centres and lathes.

Figure 1A:
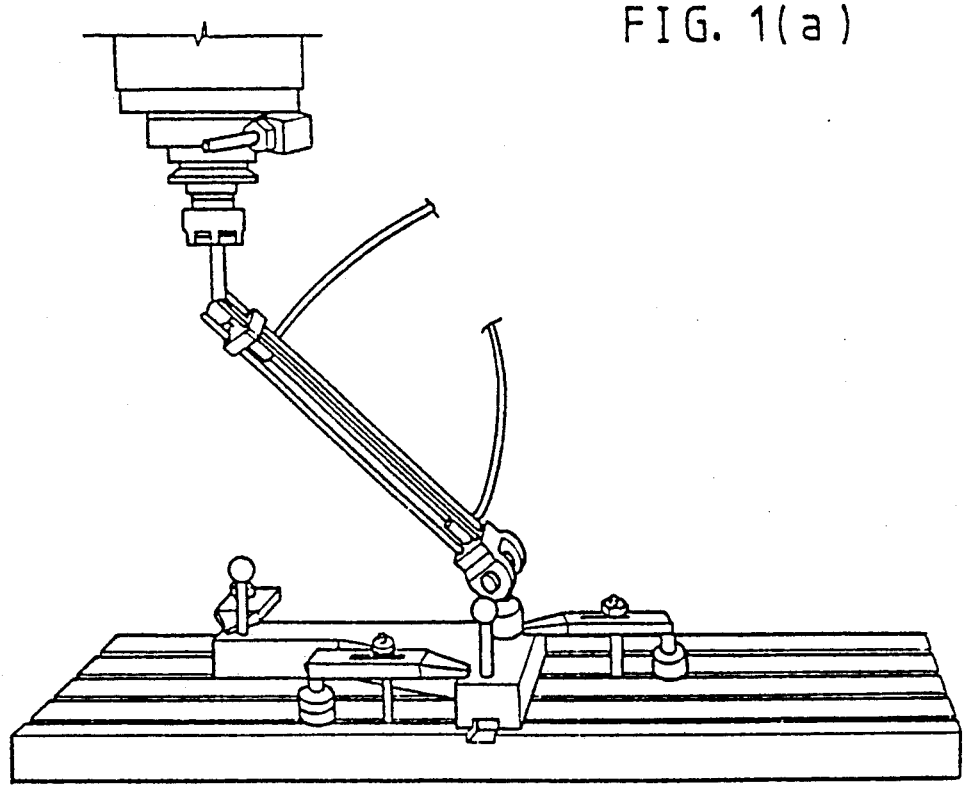
FIG. 1(a) shows a kinematic transducer link set-up on a vertical machining centre and FIG. 1(b) on a CNC turning center.
Figure 1B:
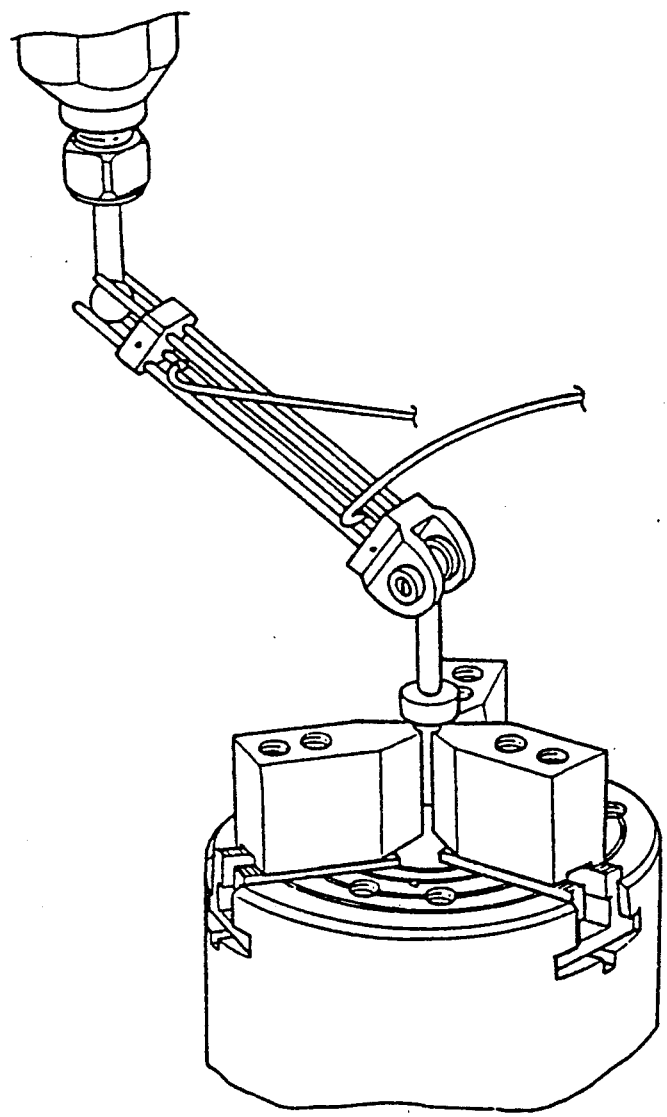

The origin of the circular contouring path is established by setting one reference ball coincidental with the centre of a second ball, i.e., the N.C. machine is programmed to move about a circular path with respect to this origin. The first ball is mounted on the working table in place of the workpiece and the other ball is mounted in place of the tool. The relative change in the distance between them during the circular contouring mode of the machine represents the radial error in the circular profile including the initial set-up error. This so called set-up error is inevitable when setting the origin between the two spheres but can be easily compensated by software analysis To carry out the contouring test on an N.C. machine tool, for example, a vertical machining centre, a ball is mounted on the spindle in place of the cutting tool, and a connecting link containing two electronic probes (linear variable differential transformer (LVDT) type) link this ball with a second ball mounted on a magnetic base on the machine table. A magnetic base is used to minimize possible damage to the machine by incorrect programming and also to simplify the set-up. FIG. 1(a) shows the kinematic transducer link set-up on a vertical machining centre and FIG. 1(b) on a CNC turning centre.

The machine tool is programmed to move around a circle or partial arc with respect to the ball in the machine spindle. If the machine has no error, and there is zero set-up error between the balls, then no relative movement can be detected from the electronic probes during this circular movement because the distance between the two balls remains constant. If, however, the machine does not move on an ideal circle because of the influence of some error including the initial set-up, relative movement between the two balls can be found and interpreted as a deviation from the nominal circular path.

Figure 2:
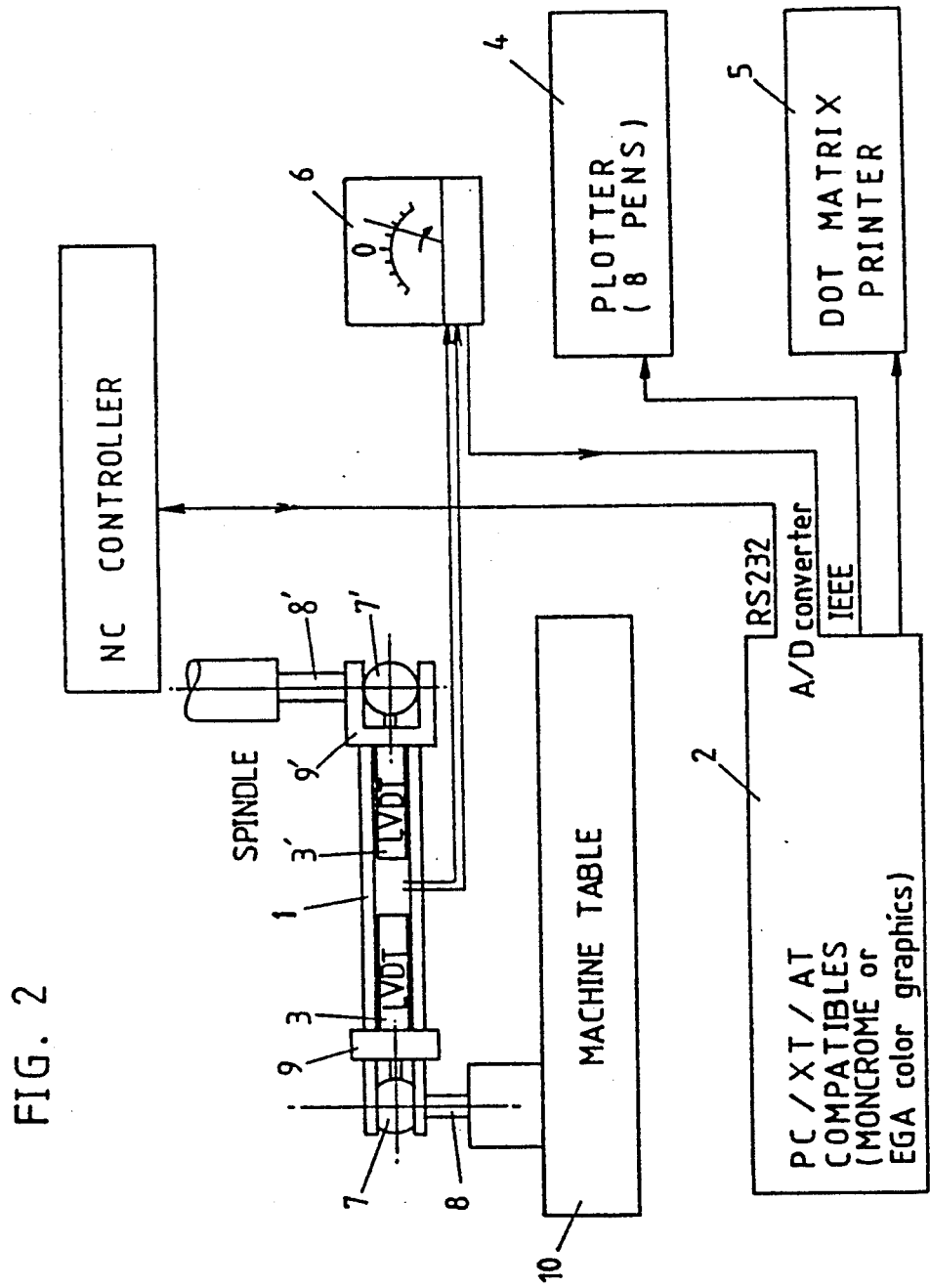
FIG. 2 is the system block diagram showing the 'JP system' comprising a kinematic transducer link and associated computer hardware which are interfaced with a microcomputer.

FIG. 2 shows the 'JP system' comprising kinematic transducer link 1 and associated computer hardware, the kinematic link contouring measurement system being interfaced with the microcomputer 2. The analogue output signal from the transducers 3, 3' is supplied to an A/D converter in the micro computer 2 where the transferred data is analyzed in terms of the deviations from the nominal circle. Using software developed in this research program, the deviations from programmed profiles are previewed and the source of errors can be analyzed and displayed on the computer monitor, with hardcopies obtained on a dot matrix printer 5 or an x-y plotter 4.

The system is composed of both newly built hardware, comprising a kinematic link 1 including two single axis linear transducers 3,3', two balls 7,7'; their supports 8,8', and an amplifier/connector 9,9', and equipment, comprising a micro computer 2, a dot matrix printer 5, a plotter 4, transducer output voltage indicator 6 and an analog to digital converter card in the computer 2.

Figures 4A, 4B, 4C:
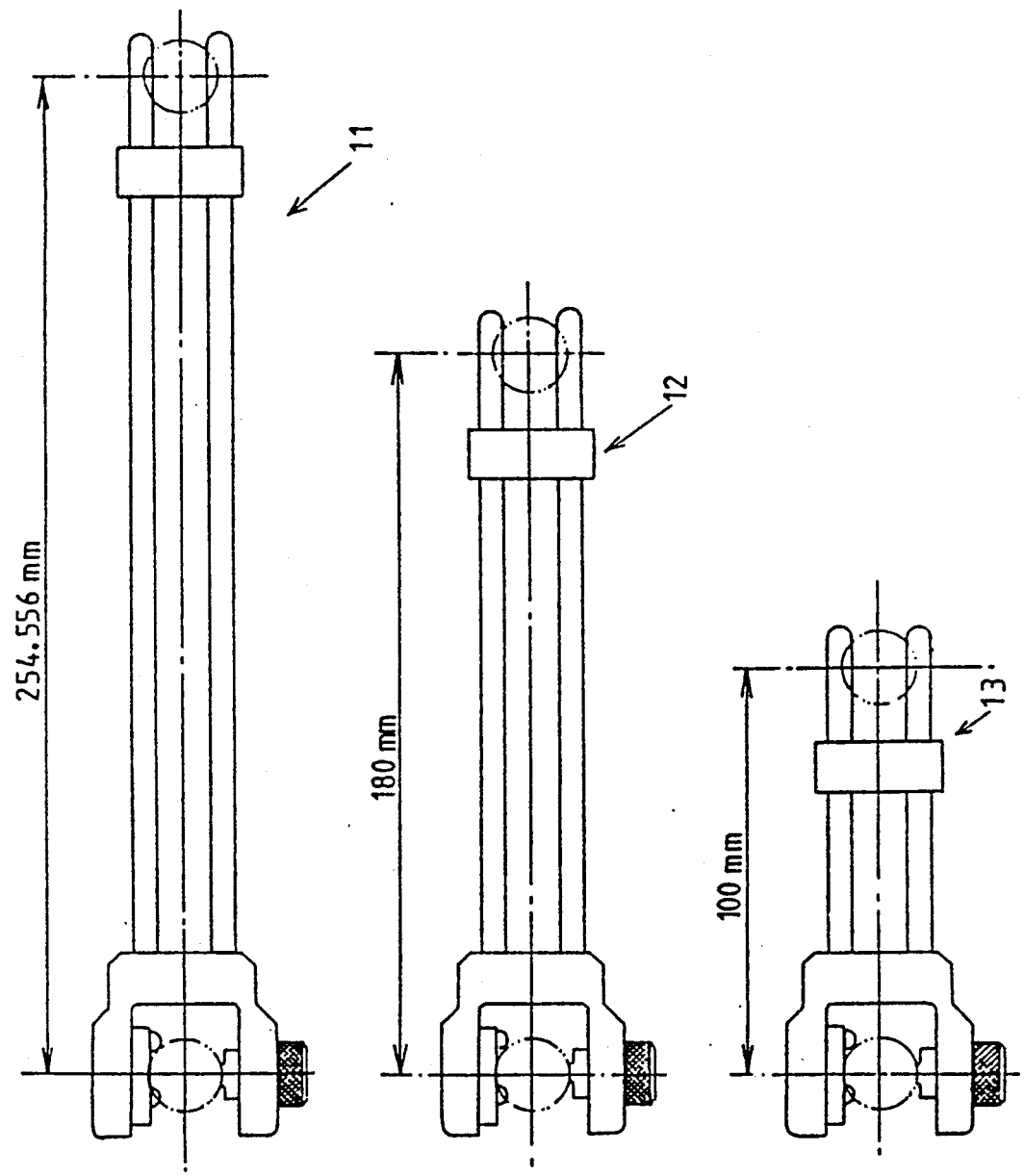
FIGS. 4(a)-(c) are views representing different sizes of links.

Several different sizes of kinematic link are constructed for different test purposes as shown in FIGS. 4(a) and (b). Corresponding sizes of kinematic link presetting fixtures are also constructed for easy pre-set-up of required set-up lengths. An amplifier/connector box 9 is built for the adjustment of different input/output voltage levels of the different equipment. Highly accurate tungsten carbide balls (Spheric Engineering, grade 05-5 $\mu$ inch sphericity accuracy, dia. 18 mm) 7,7' are used as standard reference spheres.

The kinematic link 1 is of lightweight construction from carbon fibre. In addition, the low coefficient of expansion of carbon fibre makes it thermally stable. The link 1 is supported between two spheres 7,7' in a pseudo kinematic way. Alignment of the transducer link 1 is facilitated by spring loading onto three point contacts with the ball at the workpiece position and a forked linear guide action on the sphere at the tool position.

Figure 3:
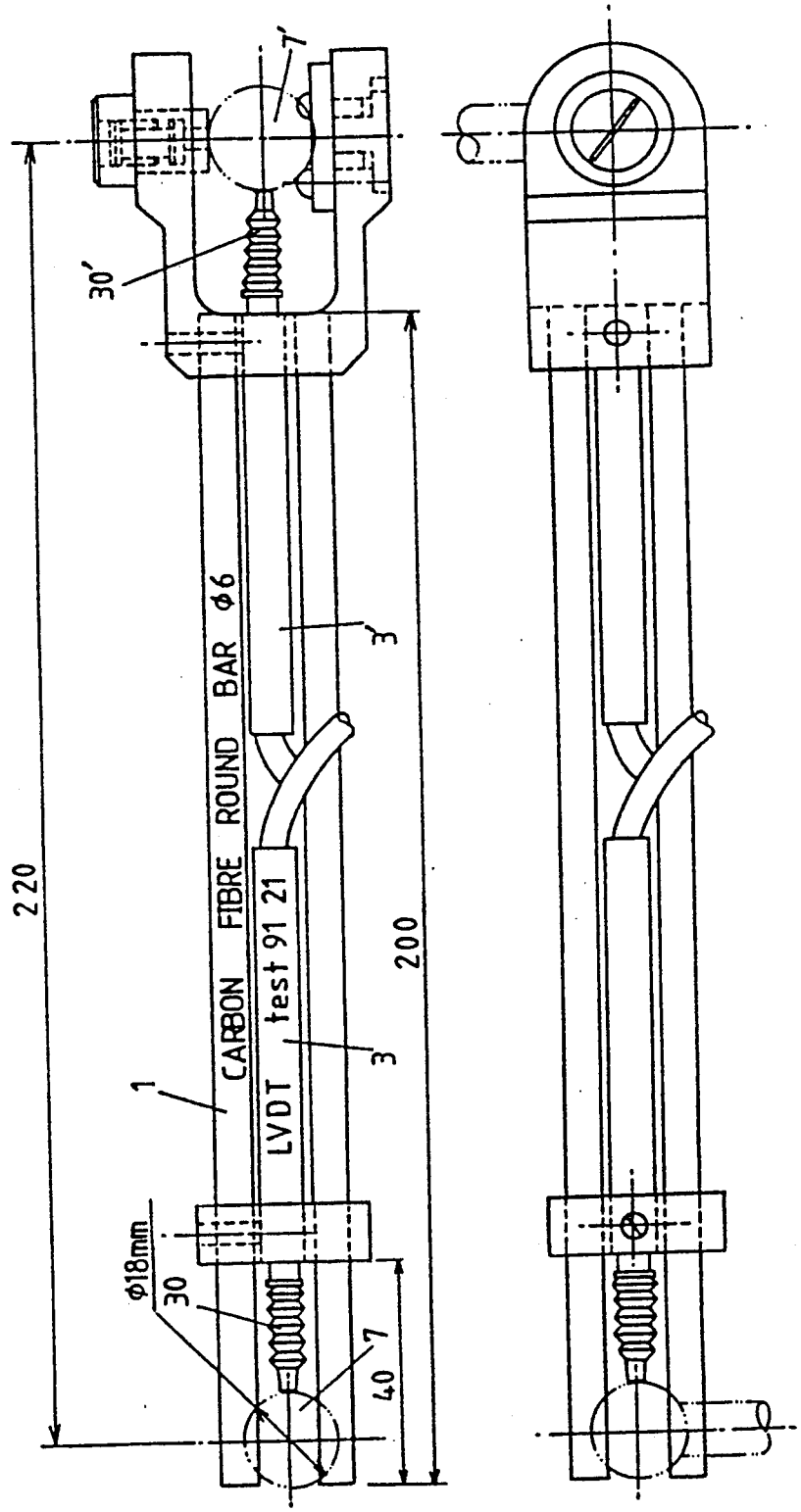
FIG. 3 is a view of the kinematic transducer link.

In the configuration shown in FIG. 3, the accuracy of the support system of the transducer link 1 only introduces second order errors in the system since the master spheres are contacted directly by the flat ended transducers 3,3'. With this arrangement, sub micron accuracy can easily be achieved.

For some applications, adequate accuracy can be obtained by using only one transducer 3 or 3' operating against the sphere 7, say at the tool position with rotation being controlled by the spring loaded three point locations on the other sphere. Although one could intuitively that this rotation accuracy would be equivalent to that of a spherical master, verification is difficult.

Figure 5A:
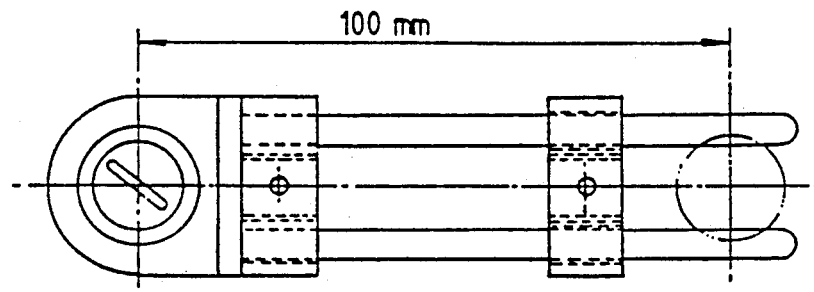
FIGS. 5(a)-(c) represent adjustable minimum kinematic link lengths using two 'TESA' made probes.
Figure 5B:
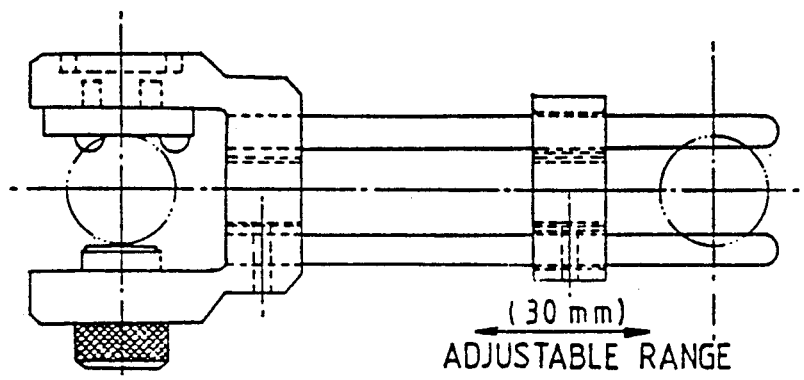
Figure 5C:
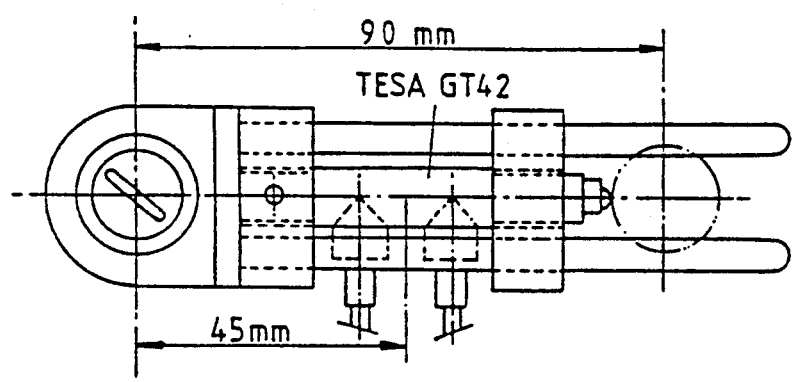
Figure 6C:
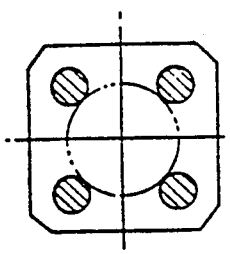
FIG. 6(a)-(c) represent a smaller size link attainable by re-positioning the transducer on the outer ends of a link.
Figure 6A:
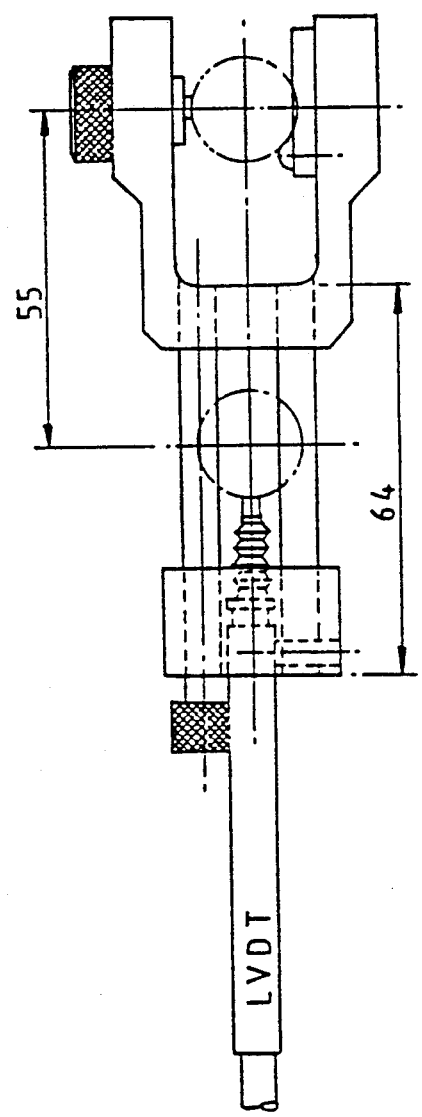
Figure 6B:
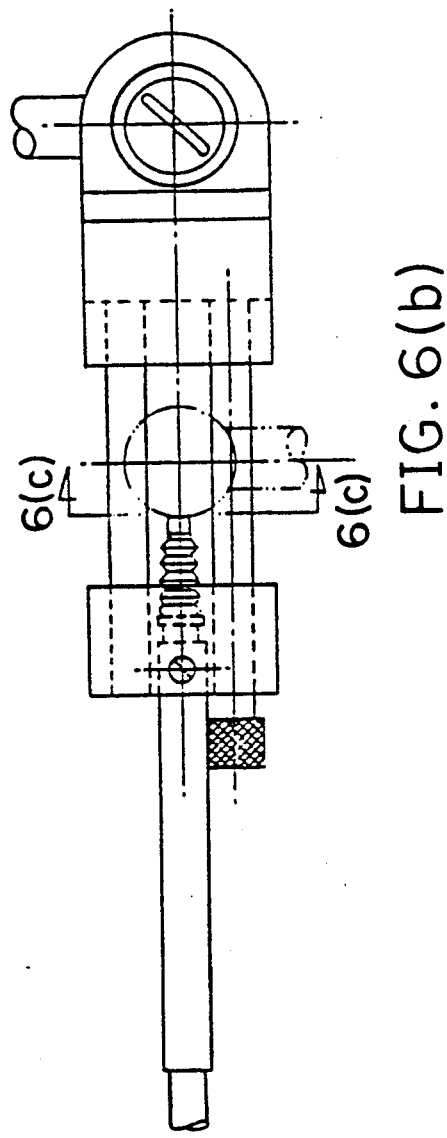

The minimum size of kinematic link 1 is governed by the length of transducer available. In the third prototype of kinematic links 11, 12 and 13 as shown in FIGS. 4(a)-(c), three different size of links 11, 12 and 13 are constructed and smaller sizes of electronic probes are used. The minimum kinematic link length using two probes 30,30' is about 90 mm, as shown in FIGS. 5(a-)-(c). Even smaller sized links are attainable by re-positioning the transducer 3 or 3' on the outer ends of the link as shown in FIGS. 6(a)-(c), although with such an arrangement the measurements are confined to a single plane at one setting.

There are numerous types of commercially available transducers which are suitable for use with the 'JP System'. For example, those manufactured by Tesa, Mahr, Mercer, etc. have a specified repeatability in the order of 0.01 μm and are adequate for the assessment on most precision machines. Tesa made inductive halfbridge principle type linear measuring probes 3,3' with analogue voltage indicator are preferably used for this invention.

Figure 7:
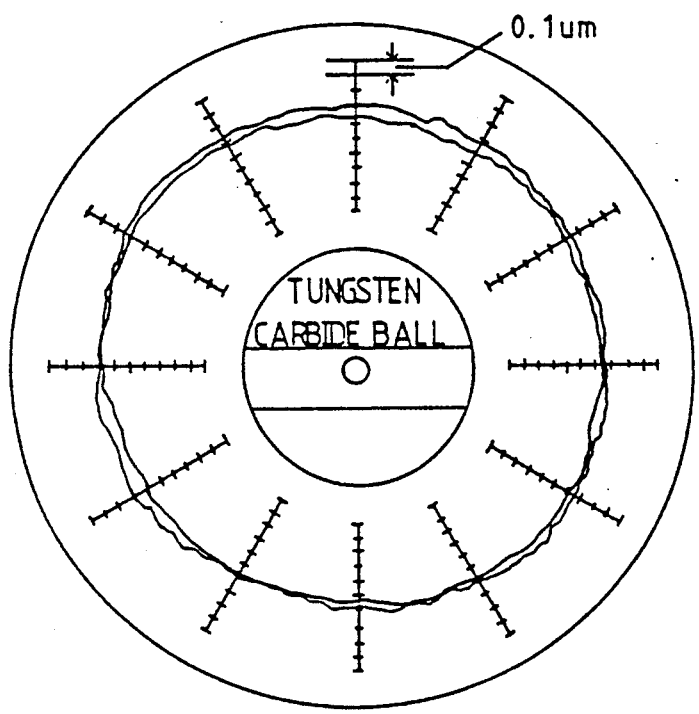
FIG. 7 shows a roundness test result of a reference ball.

The precision tungsten carbide balls are used as reference spheres because of their wear resistance and also because their accuracy is better than that of steel balls. The roundness of these balls is tested and results are shown in FIG. 7. As shown in FIG. 7, the roundness error of the ball is about 0.1-0.2 μm.

Two ball holding supports 8,8' are prepared, one holding support the one 8 is mounted onto a tool post instead of the cutting tool and the other holding support 8' is used as a centre of contouring motion and is connected to a magnetic base and located on the machine table 40 during the test. The balls 7,7' are mounted onto the ball holding supports 8,8' by special glue (CIBA GEIGY, Araldite 2005).

Figure 8A:
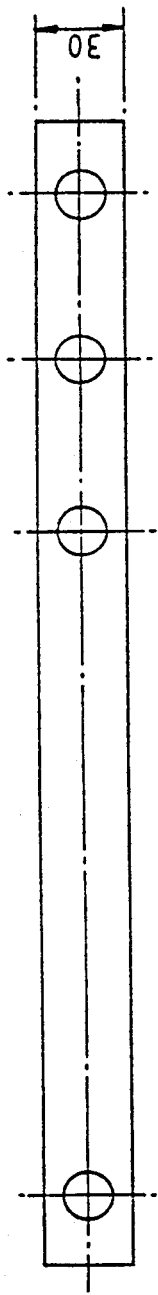
FIG. 8(a)-(c) show kinematic transducer link setting fixtures.
Figure 8B:
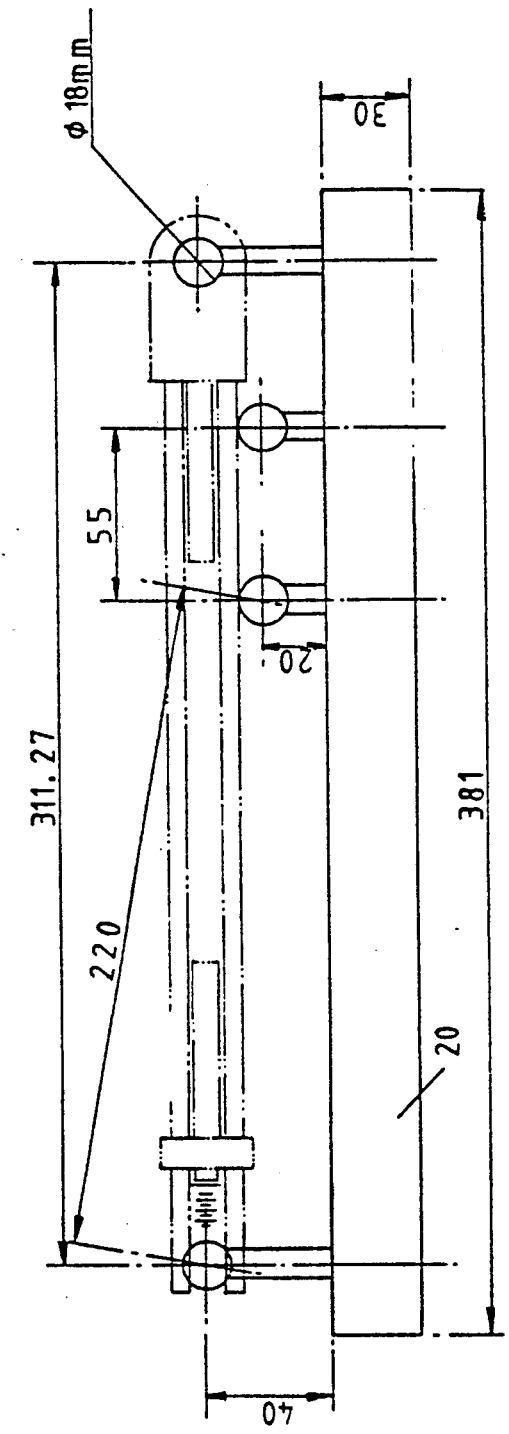

The Kinematic transducer link setting fixtures are constructed by mounting several balls onto the ball holding supports 8,8' onto a stiff steel base 20 as shown in FIGS. 8(a)-(b). The reference balls are mounted onto the ball holding supports by special glue and ball holders are fitted to a thick square steel bar (30 mm) by tight fitting screws 20. Thick square steel bars are used to prevent bending distortion. Using several balls, several reference distances can be pre-set for the different reference length settings. As shown in FIGS. 8(a)-(b), this fixture can also be used as a reference ball support on the machine bed instead of the magnetic base for the different positions for the geometric check test. The center distance between the balls preferably is accurately calibrated against an HP laser interferometer system.

An integrated computer program named JP is developed for the contour motion measurements, plotting of the contour paths, analysis of the contour test results and origin of the error source. The program consists of several small programs such as 'Calibration,' 'Basic profile test,' 'Geometry check test,' and 'N.C. check test.' Each of these subprograms is divided into several small programs by its function and procedure such as data sampling, data averaging, contour path analysis, and contour path plot.

Figure 9:
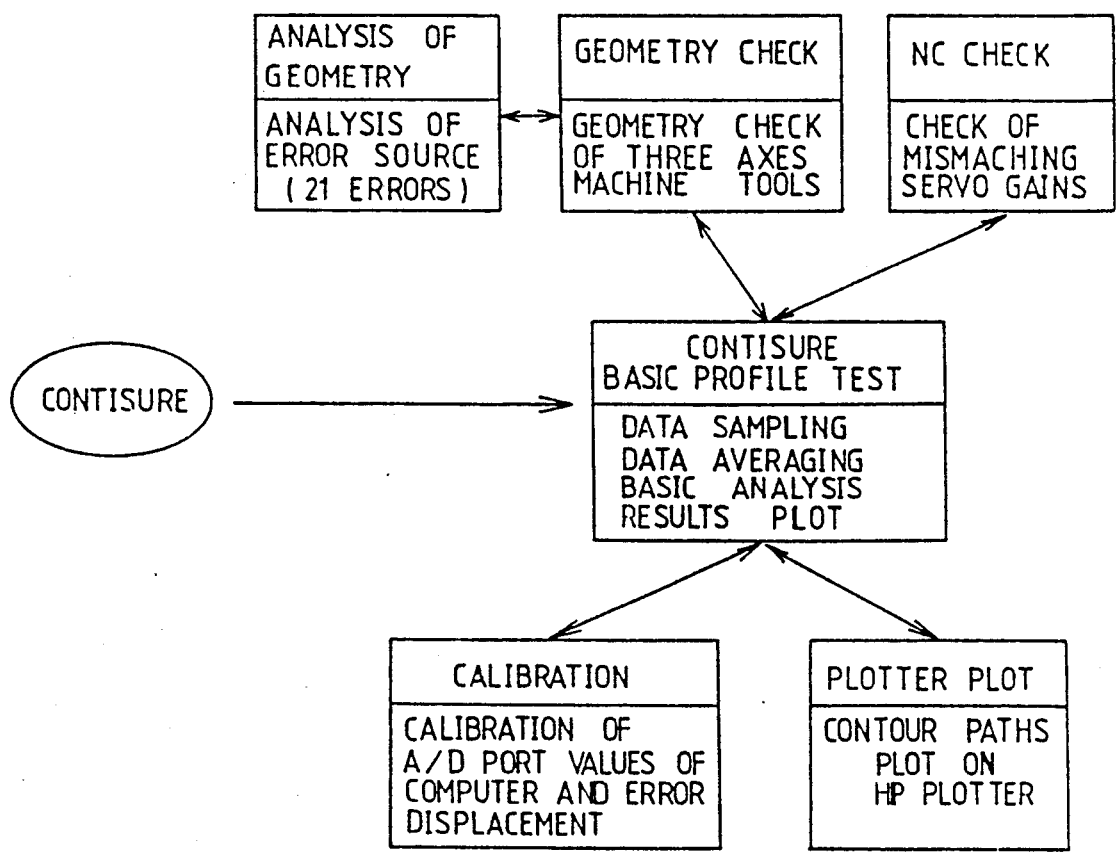
FIG. 9 is the block diagram showing a basic structure of the program.

FIG. 9 shows the basic structure of the 'JP' program. The advantages of using computing techniques for these applications are: the output voltage signal from the measuring system is read and averaged and saved by the computer via associated interface hardware and software, some statistical tools such as mean, standard deviation, and least squares method for best fitting a curve are quickly calculated for the sampled data, simultaneous solutions for a set of linear equations such as a Gassian elimination method and other numerical methods are used during the evaluation of the test results, and when associated with graphic software, test results are plotted on the monitor or on the printer or plotter.

To retain the concept of traceability of the measurements, the output from the TESA unit (electronic probes) must be precisely understood by the computer program in terms of the displacement of the probe. This is achieved by developing a transfer calibration program which enables the A/D value to be obtained in terms of the movement of the transducers. The value at the zero position of the probes can also be evaluated.

Figure 10A:
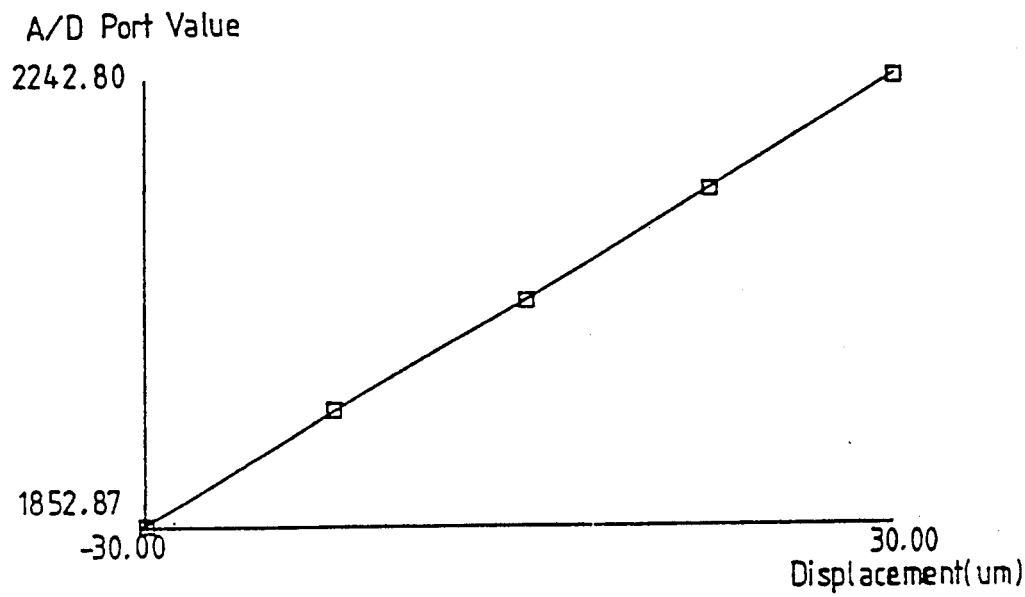
FIG. 10(a) is an example of a typical calibration of port value against displacement in microns.
Figure 10B:
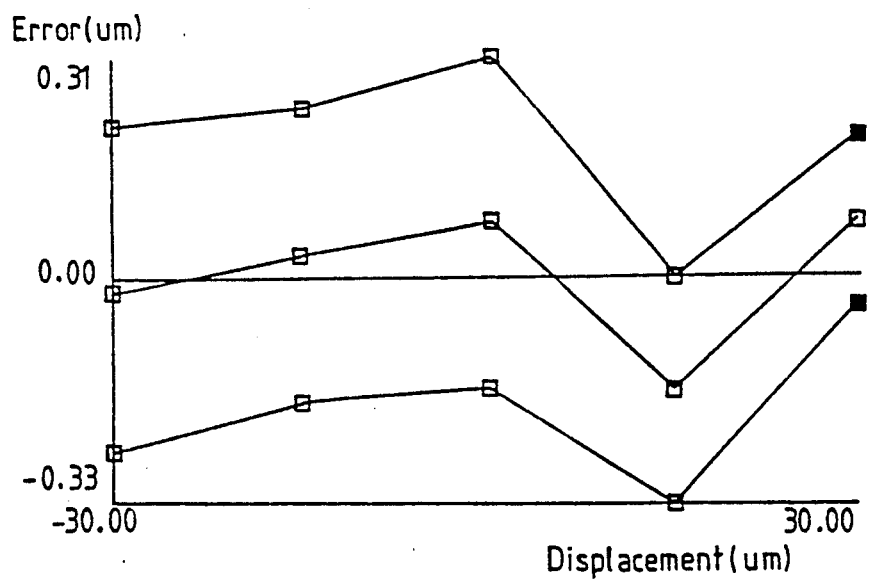
FIG. 10(b) is the deviation of the transferred points from the least squares equation where the corresponding signal noise is assessed in terms of 3 $\sigma$.

This calibration transfer is achieved by computing a least squares line through several A/D port values and corresponding readings on the TESA displacement unit. This linear calibration equation is of the form $$A/D \text{ value} = P \cdot X + Q$$

where
P: port value/displacement (μm)
X: displacement of electronic probe (μm)
Q: zero set up position port value An example of a typical calibration of port value against displacement in microns is shown in FIG. 10(a). The deviation of the transferred points from the least squares equation is shown in FIG. 10(b) where the corresponding signal noise is assessed in terms of 3 σ (standard deviation).

The thermal expansion or contraction for the kinematic transducer link and the kinematic link setting fixture due to variation of the ambient temperature should be considered Therefore, the relationship between the ambient temperature and the kinematic link set-up length were investigated by several measurements at different temperatures. As shown in FIG. 11, the displacement value from the same setting on the TESA displacement unit are increased 1.2 μm as the temperature increases one degree. This value is used as the thermal error compensation value for the kinematic link and the setting fixture throughout the software analysis.

Continuous voltage output of the electronic probe on the kinematic reference link during the contouring test is transferred via an A/D converter to the computer 2. For the analog to digital conversion, any commercial hardware card can be used such as, Lab Master, pc-26, pc-30, etc. The Lab Master card, which provides from 8 to 256 channels for A to D conversion, 12, 14 and 16 bit resolution, 30, 40, or 100 KHz conversion rate, and the pc-26 card, which provides 16 channels for A to D conversion, 12 bit resolution, 25-35 KHz conversion rate, are used for A to D conversion in the 'JP system.' The transferred data is read from the A/D card by software.

After the general test data such as test series number, test date and condition of tested machine has been input, the computer 2 is ready to sample the analogue signals from the transducer link. This sampling of the error data must be synchronised with the start and stop positions on the profile, and consequently, there must be some level of communication between the N.C. operation on the machine and the computer program controlling the data acquisition.

Figure 12A:
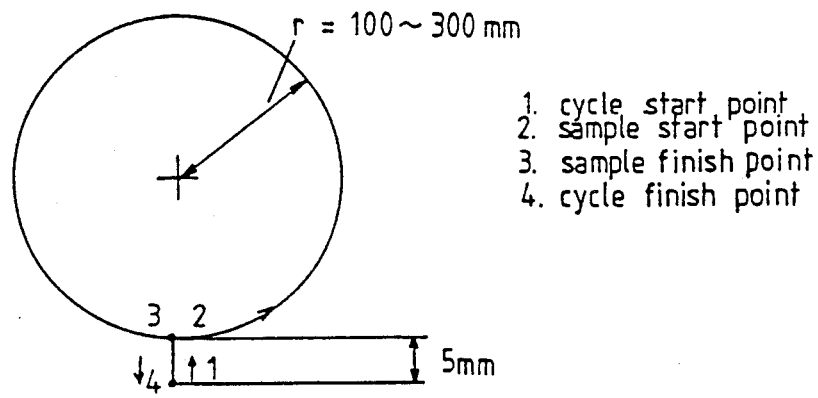
FIGS. 12(a) and (b) represent basic principles of sampling start and finish.
Figure 12B:
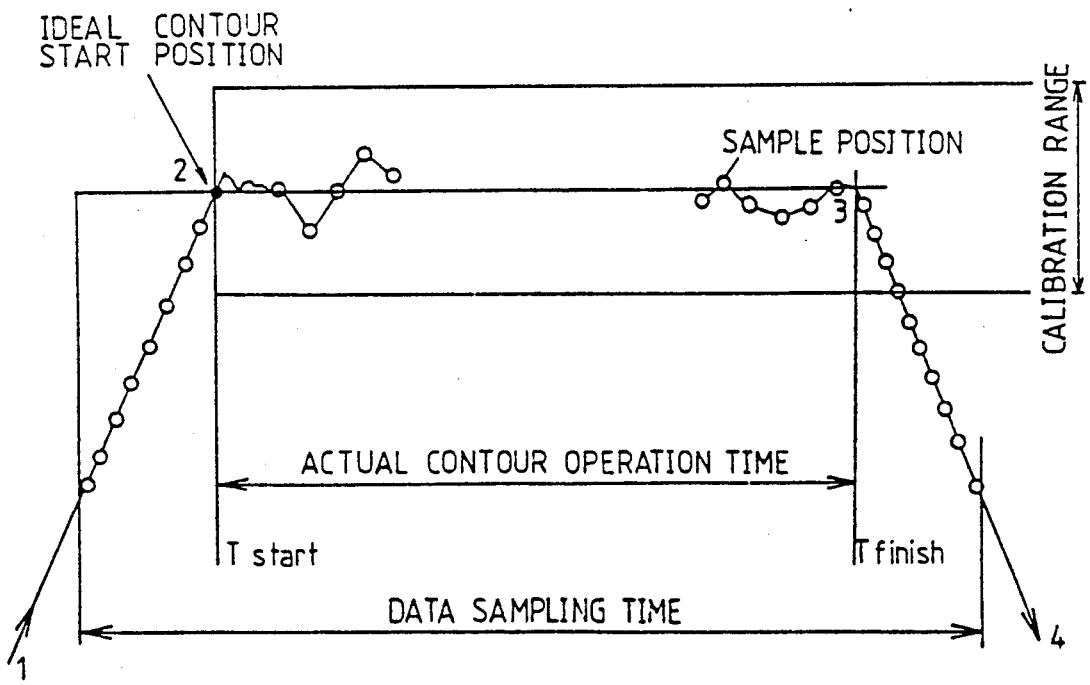

With the 'JP system,' an algorithm is devised in conjunction with an N.C. programming strategy which enables the data to be sampled automatically over the desired profile path. For example, the N.C. program for a specified circular profile includes a five millimeter 'run in' and 'run out' path in a nominal direction to the desired profile. FIGS. 12(a) and (b) show the principle of sampling starting and finishing. As shown in FIGS. 12(a) and (b), the transducer measures over a range which is two or three times greater than the possible error range. Data is sampled over this range and therefore unwanted data is recorded at the beginning and the end of the data sampling period. These data must be eliminated before the contour error analysis. This is achieved by counting the number of sample readings prior to the kinematic link reaching its nominal contouring radius position which is the ideal starting place for the sampling. This means that the number of initial counted samples can be ignored. This process is also repeated at the end of the sampling period. It is worth noting, however, that because of the high sampling rate, the difference between the nominal and actual starting position is extremely small. Therefore the error induced due to this difference does not influence tee error analysis. This strategy results in the transducer output being outside the measuring range at the start and end points of the profile and can be easily detected by the data acquisition procedure. Because of this sampling strategy and linear guide style action to the master sphere in the kinematic link, continuous data sampling for different planes is possible without resetting and remounting of the kinematic transducer link on the machine.

The number of samples taken over the test is related to the sample speed of the software, A/D interface conversion rate and contouring velocity of the machine. In practice, these usually result in an excessive number of data points which will add to the computation and plotting time of the results. Therefore the amount of data is reduced to about 2,000-4,000 points by control of the sampling speed in the software. These data are further reduced by calculating the mean value from each reading over each one degree interval along the profile. These data are now saved in a data file for later analysis.

Figure 13:
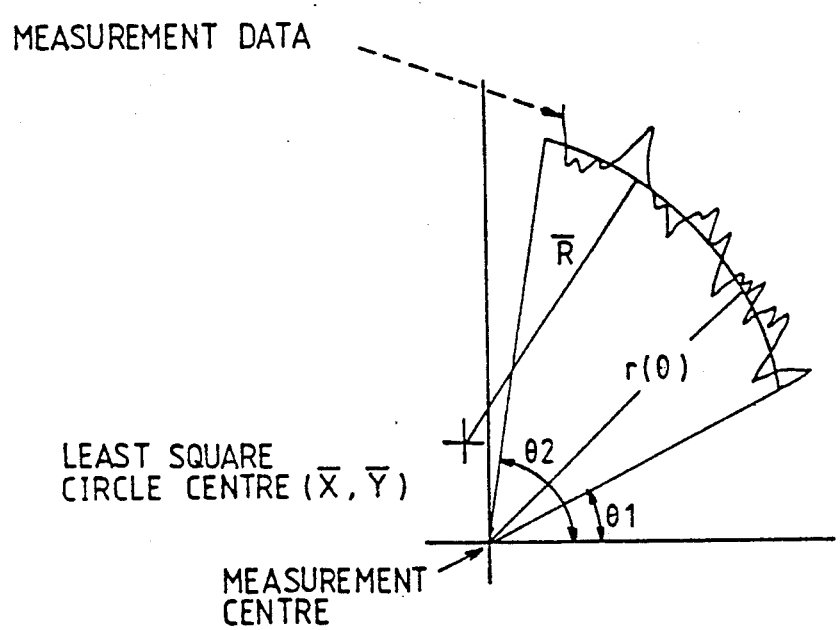
FIG. 13 shows the best fitting curve for partial arcs.
Figure 14A:
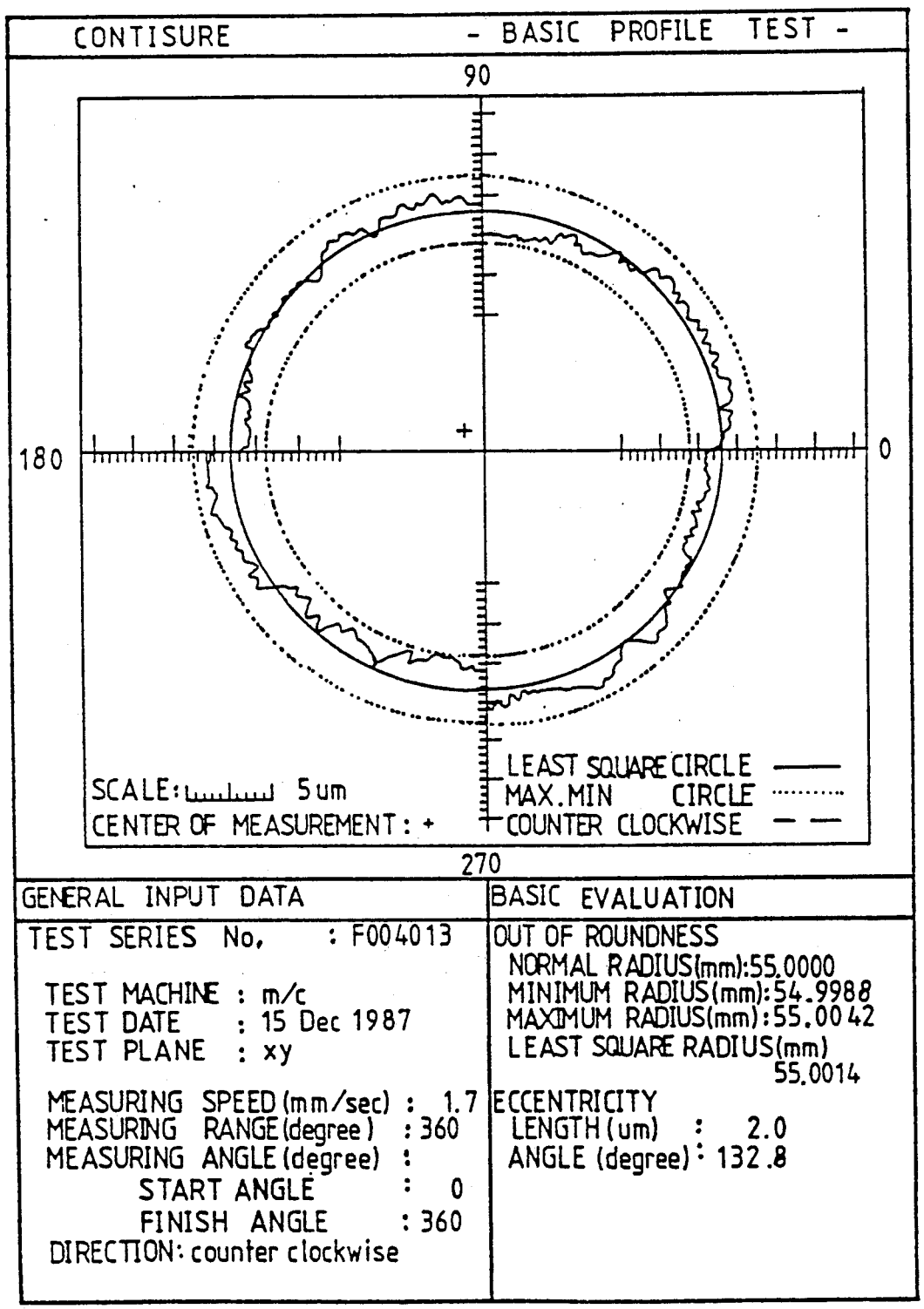
FIGS. 14(a) through (d) show some examples of plotter print out of the Basic Profile Test.
Figure 14B:
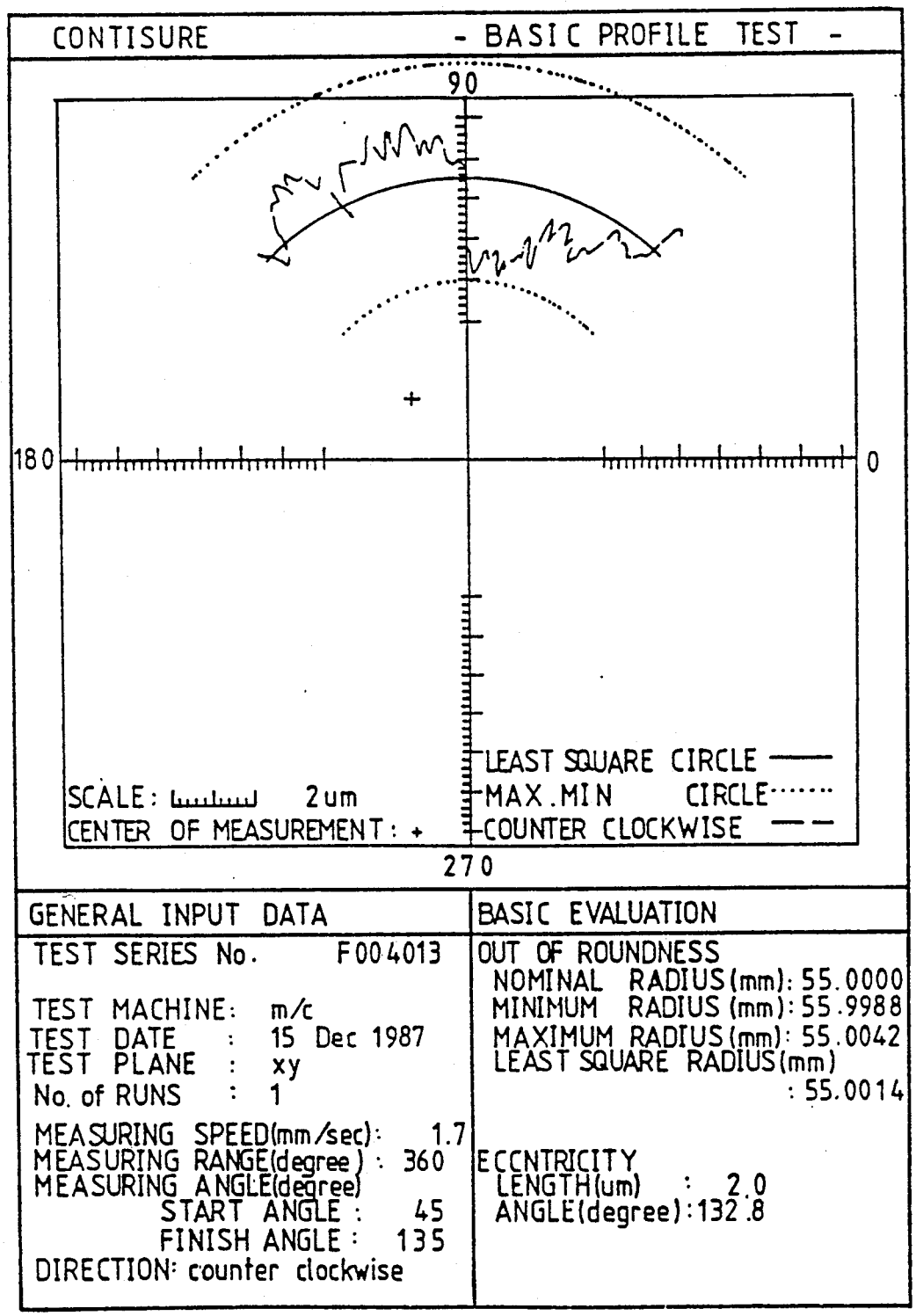
Figure 14C:
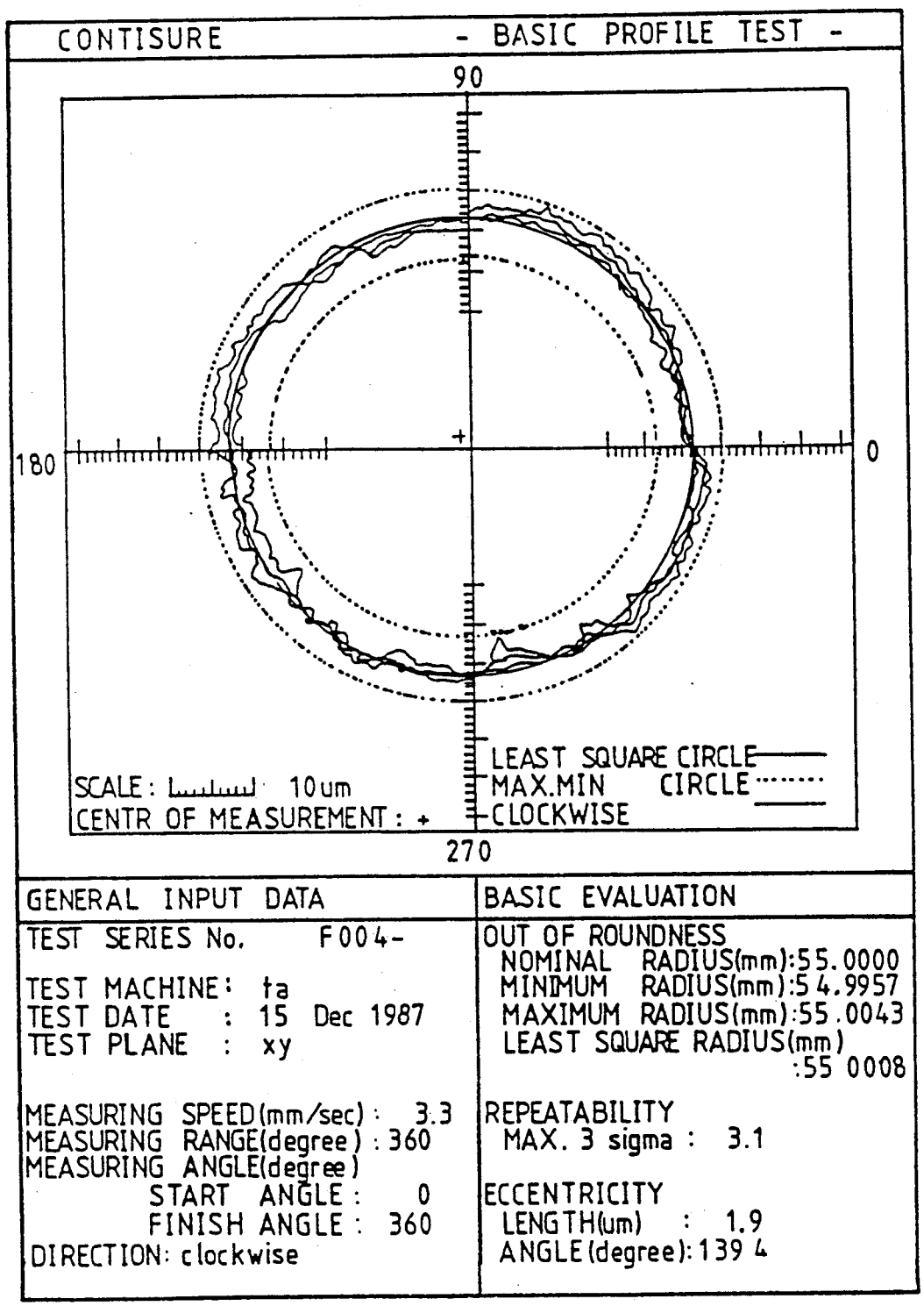
Figure 14D:
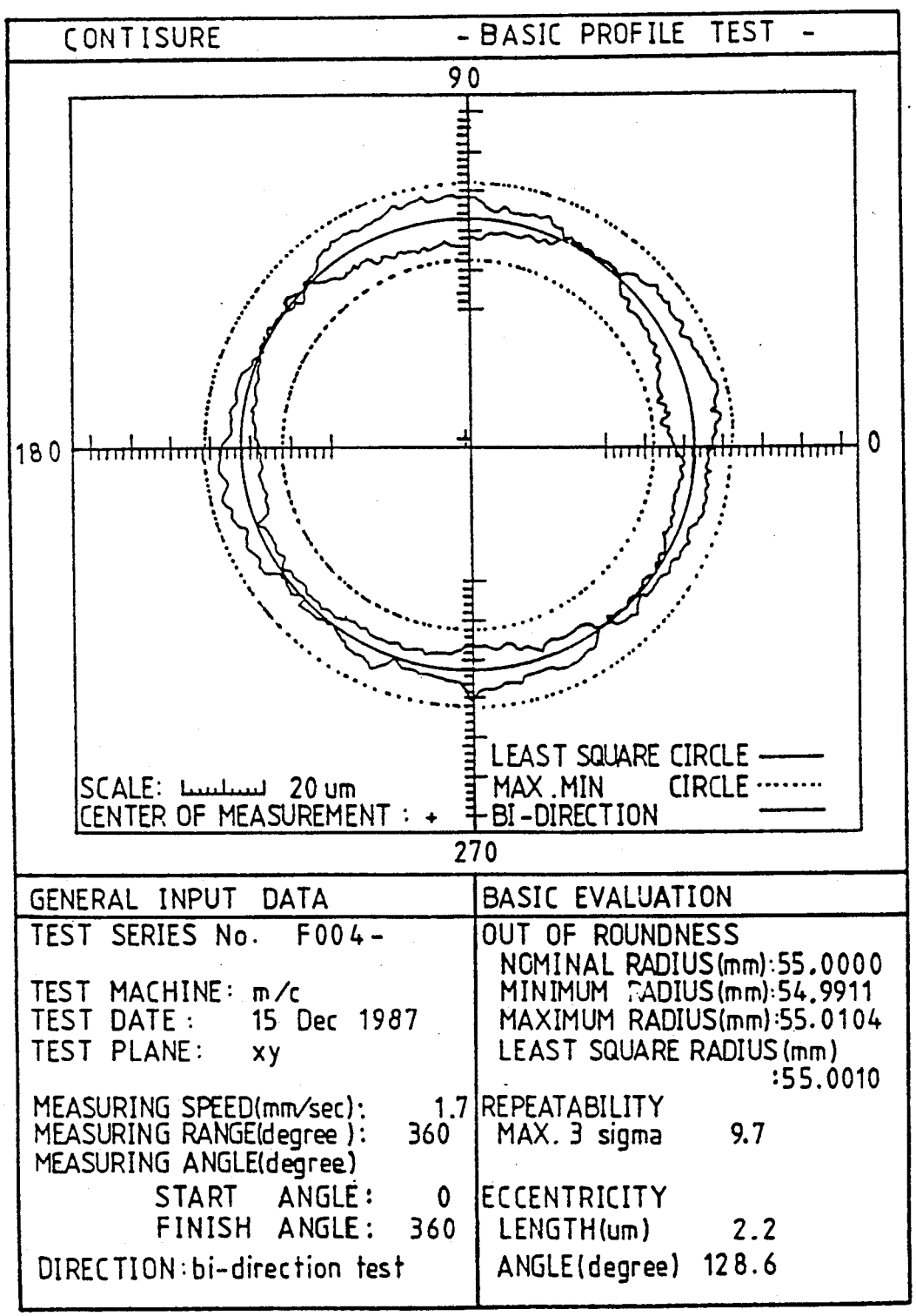

FIG. 13 shows the generalized case of the measurement centre and least squares centres with respect to the measured profile.

All possible different geometric errors can be checked using the 'Geometry check test' software. In order to analyze these error components, two different position tests for three axes are necessary.

The N.C. and Drive system can be checked using the 'N.C. check test' software by applying different speed of contouring.

Measurement data is analyzed in terms of the circular form deviations from the nominal circle (least squares circle). The circular path and evaluation results are displayed on a monochrome or EGA colour monitor with help of a general purpose commercial graphics software utility (Graphic X, Metawindow, etc.) and hardcopies are also obtained on a dot marix printer or x-y plotter.

FIGS. 14(a) through (d) show some examples of plotter print out of the 'Basic profile test'. Using software developed in this system, any part of partial arcs/circle can be plotted and the magnification of error plot size can be adjusted manually or automatically (see FIG. 14(b)).

Although this new contouring test method can provide similar functions to the already developed circular test methods, it is considered to be better in many respects as it incorporates automatic measurement facilities and computer aided evaluation. In addition, because of its low manufacturing cost, fast measurements and evaluation, simplicity of set-up, high accuracy, and self checking features, it is a highly cost effective method for routine testing of machines. For example, thermally induced error between the machine table and spindle after the machine has undergone a typical duty cycle can be established and it is also possible to formulate a program test of several machine tools in a workshop at regular intervals throughout their useful lives.

Using several different sizes of kinematic link, the different sources of machine error can be separated. For instance, when applying a short length kinematic link, geometric errors have only a small influence provided that there are no discontinuities in the guideways or scales. Therefore the test with the short length kinematic link generally shows the performance of control systems and performance of drives (hysteresis, linearity).

This system should be supplemented with gauge blocks, step bars, and a laser interferometer to establish the displacement accuracy of the axes. A further feature of this system is that it can be initially set to a precise absolute length with the aid of a calibrated fixed ball setting fixture.

The characteristics and advantages over other N.C. machine tool testing devices is as follows:
Comparison standard: Two precision balls
Error pick up: One dimensional probe
Measurement and plot: Probe(s)→computer→plotter/printer
Set up/Handling: Simplest and easiest
  1. Same function as TMBB method,
  2. Continuous tests for different planes without resetting, remounting of kinematic link
  3. Automatic elimination of set-up error by software.
Evaluation of Error: Geometric error, N.C. and drive error Thermally induced error (computer aided automatic)
  1. Fast check of machine accuracy,
  2. Automatic magnification of error trace,
  3. Partial arc evaluation,
  4. Comparison with previous test results is possible, because all the previous measurement data is saved in a data file,
  5. Automatic analysis of test results.

Practical/Economic Viability: Easy to test, user friendly, accurate and fast analysis of contour error, and simple and inexpensive hardware.

EXAMPLES

The accuracy of an N.C. machine tool with three axes was checked and sources of the error motion were detected by continuous tests at different positions with different sizes of kinematic links. For these tests, a program named 'Composite test' was developed (see FIG. 9 for the structure of the 'Composite test' program). Using this software, three different types of composite tests such as geometry check test, N.C. and drive check test and thermally induced error check test, were carried out and each of the contour path results was analyzed using the actual machine test run data. For this test, a vertical type Machining centre was used throughout the test.

EXAMPLE 1

Geometry Check Test

1. Scope

A comprehensive and rapid check of the geometry for a three axes N.C. machine tool and the diagnosis of the contour motion error source can be determined by computer aided analysis from several data samplings for the three axes. For this test, the contour tests should be carried out in at least six different positions, i.e. two positions per each axis. From these tests, angular motion (pitch and yaw) and roll motion accuracy and perpendicularity (squareness) of each axis as well as dynamic positioning accuracy could be checked.

Positioning errors can be separated from the angular errors by carrying out a two position test in each axis. The roll movements are not measured in their absolute values, but in respect to their difference. The pure angular errors can be obtained only if the errors are linear, by subtracting the results obtained from two different radius contour tests.

Squareness errors of each axes were calculated from the specified angle value of the averaged contour path results.

Flatness of the x-y moving plane during the contouring in the x-y plane were also evaluated by carrying out two different position tests using different sizes of the kinematic link.

2. Test Procedure

Figure 15B:
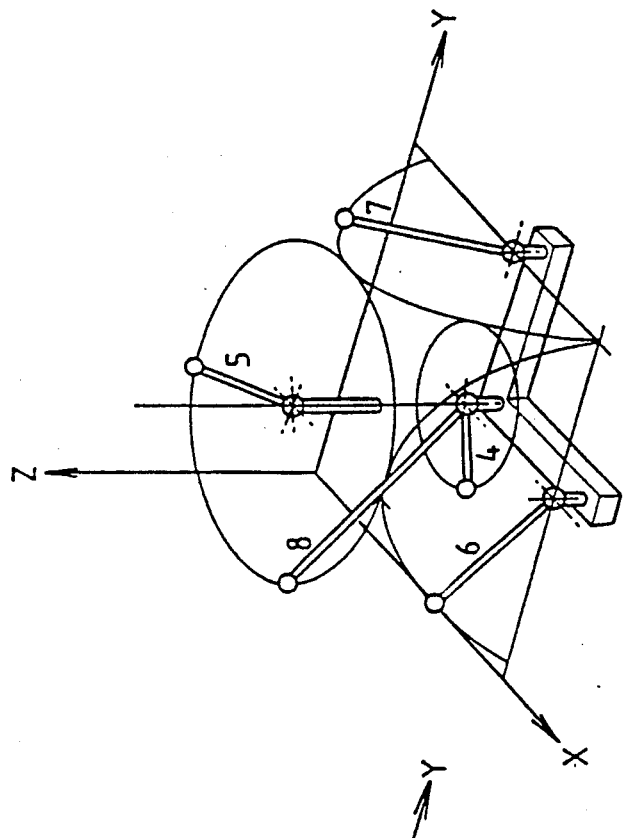
FIGS. 15(a) and (b) show measurement positions for different purpose tests.
Figure 15A:
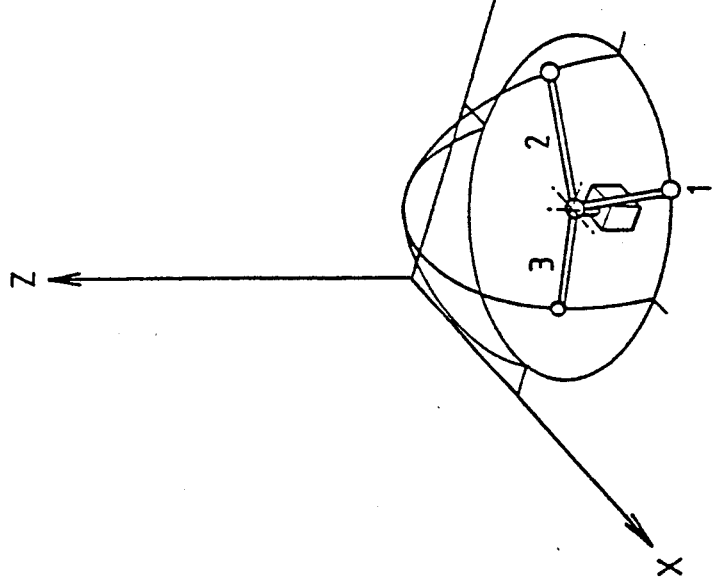

N.C. programs for several contouring motions in the different positions shown in FIGS. 15(a) and (b) were initially prepared and transferred to an N.C. controller via the RS 232 interface or by keyboard input.

(1) Select the maximum available size of kinematic link for the test;

(2) Calibrate of the A/D port value against the displacement value of the electronic probes.

Figure 8C:
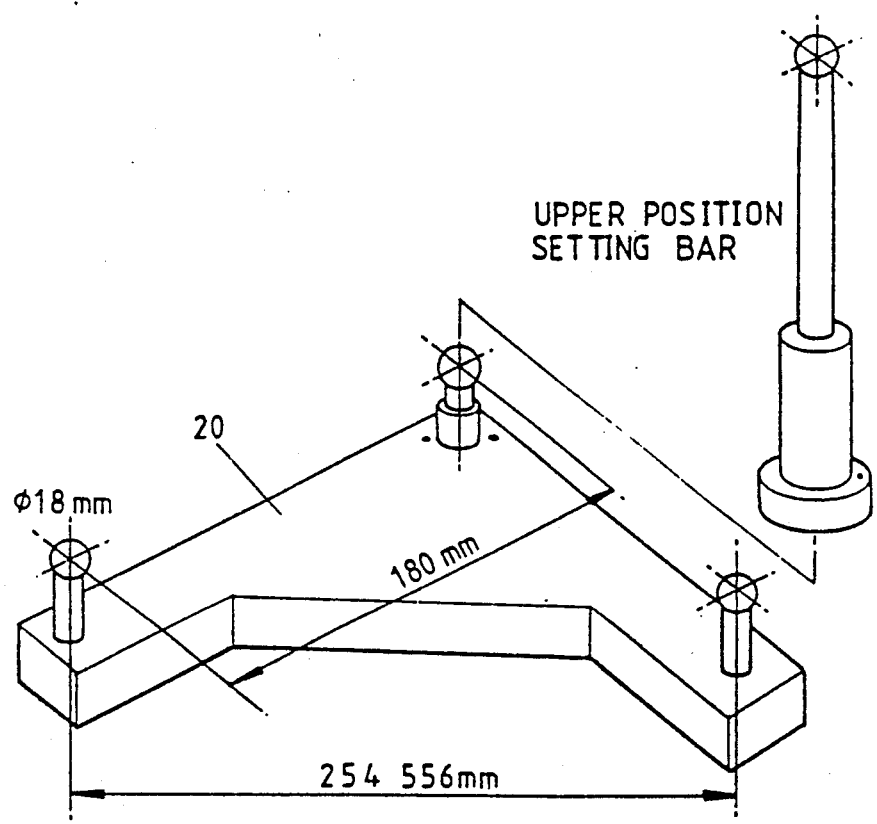

(3) Set of the kinematic transducer link using the setting fixture. The kinematic transducer link was mounted on the kinematic link setting fixture as shown in FIG. 8(c), which was already preset on the machine table. The kinematic link with electronic probes was then set to zero using the dial on the analogue elctronic gauge 6 which was connected directly to the electronic probes.

(4) Mounting of the reference balls. One ball support was clamped to the machine spindle and the centre of the other ball on the kinematic link setting fixture was set up to be coincident with the ball centre position in the spindle.

(5) Checking of N.C. program. Execute the N.C. program to verify whether the contouring errors were within the selected range of the transducers before taking any measurement with the kinematic transducer link.

(6) Load the kinematic transducer link on the testing machine. After cleaning the two reference balls located on the spindle and the setting fixture, the selected kinematic link was mounted between two balls.

(7) Measure the ambient temperature. The ambient temperature near to the machine tool under test was measured in order to compensate the effect of the ambient temperature on the measuring system and to investigate the thermal influence of ambient temperature on machine tool errors.

(8) Load 'Geometry Check Test' program on the computer and enter the general input data for the test.

(9) Check the interface between the kinematic transducer link and the computer and press the cycle start button on the N.C. controller of the machine under test to execute the program, 'Geometry Check Test.'

After completion of the set up, measurements can commence by pressing the machine cycle start button on the N.C. controller after which the actual test procedure is followed by the software program. After finishing the data sampling of one plane of the test, the kinematic link should be reloaded for the different position tests, and the same data sampling procedure repeated until all the different position tests are completed.

Figure 16:
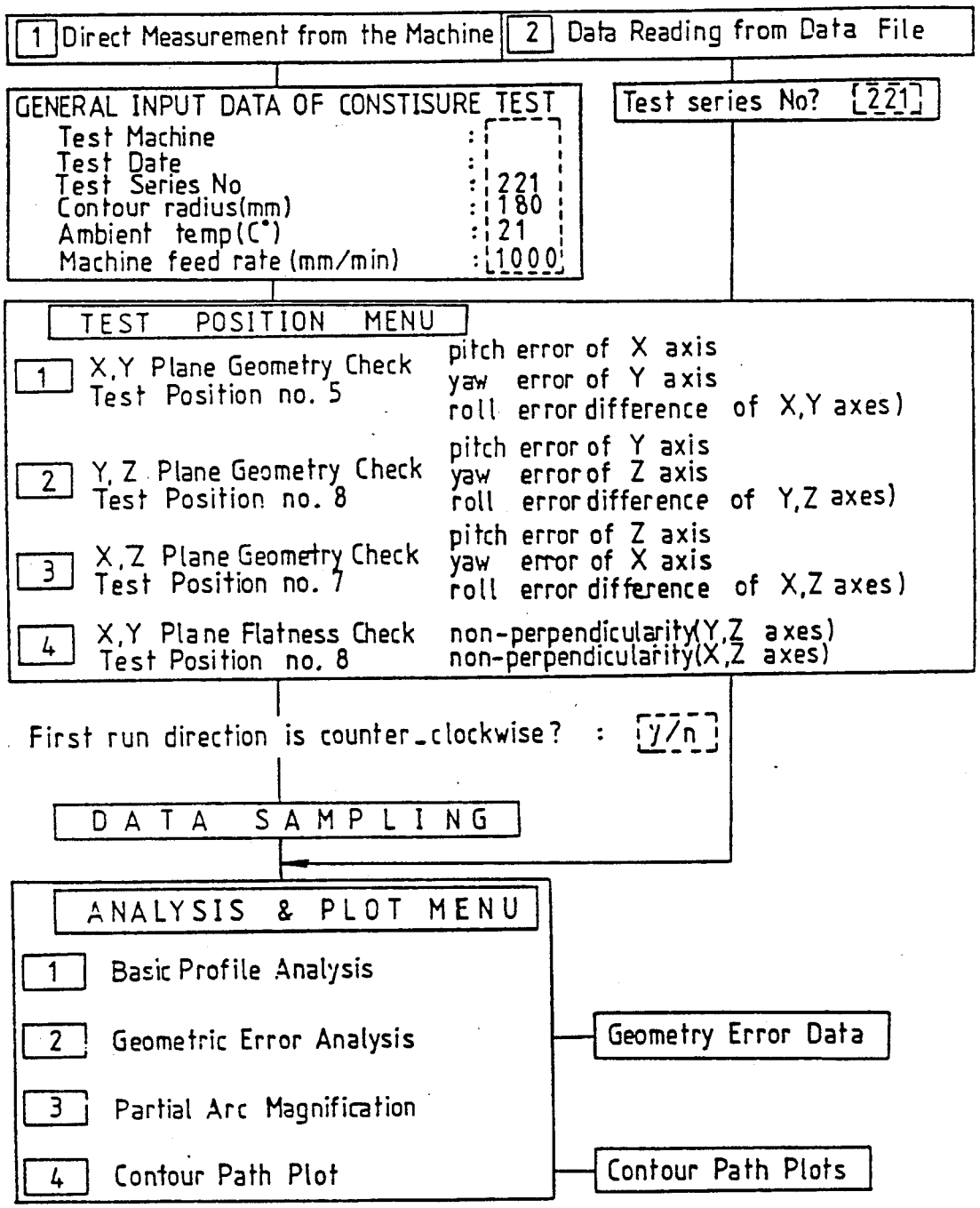
FIG. 16 is a flow diagram of the geometry check test program.

After saving the measurement data, testing can continue, or alternatively, the analysis of contour motion data can begin. FIG. 16 shows the flow diagram of the 'Geometry Check Test' program.

The most significant parameters for geometry checking are the radius of contouring and contouring speed. Speed of measurement should be slow (1-10 mm/sec) so that any errors from the drives and control system are not significant.

The maximum size of the kinematic link is selected to minimize the errors from the N.C. and drive system. The maximum size of the kinematic link depends on the size of the operation range of the machine under test.

Contouring accuracy is affected by environmental effects such as environmental temperature, external vibrations, etc. These environmental effects should be minimized.

3. Evaluation of the Geometry Check Test Results

The evaluation of the geometry check test with contouring arcs/circle path plots were presented on the monitor by execution of the software 'Geometry Check Test.' The paths of two different test positions were shown together and contouring radius values for some important angles were compared with each other. Using this software, basic evaluation results were calculated as well as dynamic positioning error, angular error, flatness error and squareness errors. The general input data were also saved in each data file during the test and presented with the analyzed results.

Input Data

Test Machine name, Test Date, Test series Number,
Test Condition: velocity of measurement (contouring speed), measurement plane (e.g. xy plane) contouring radius (radius of kinematic link)

Analysis of Results

Figure 17A:
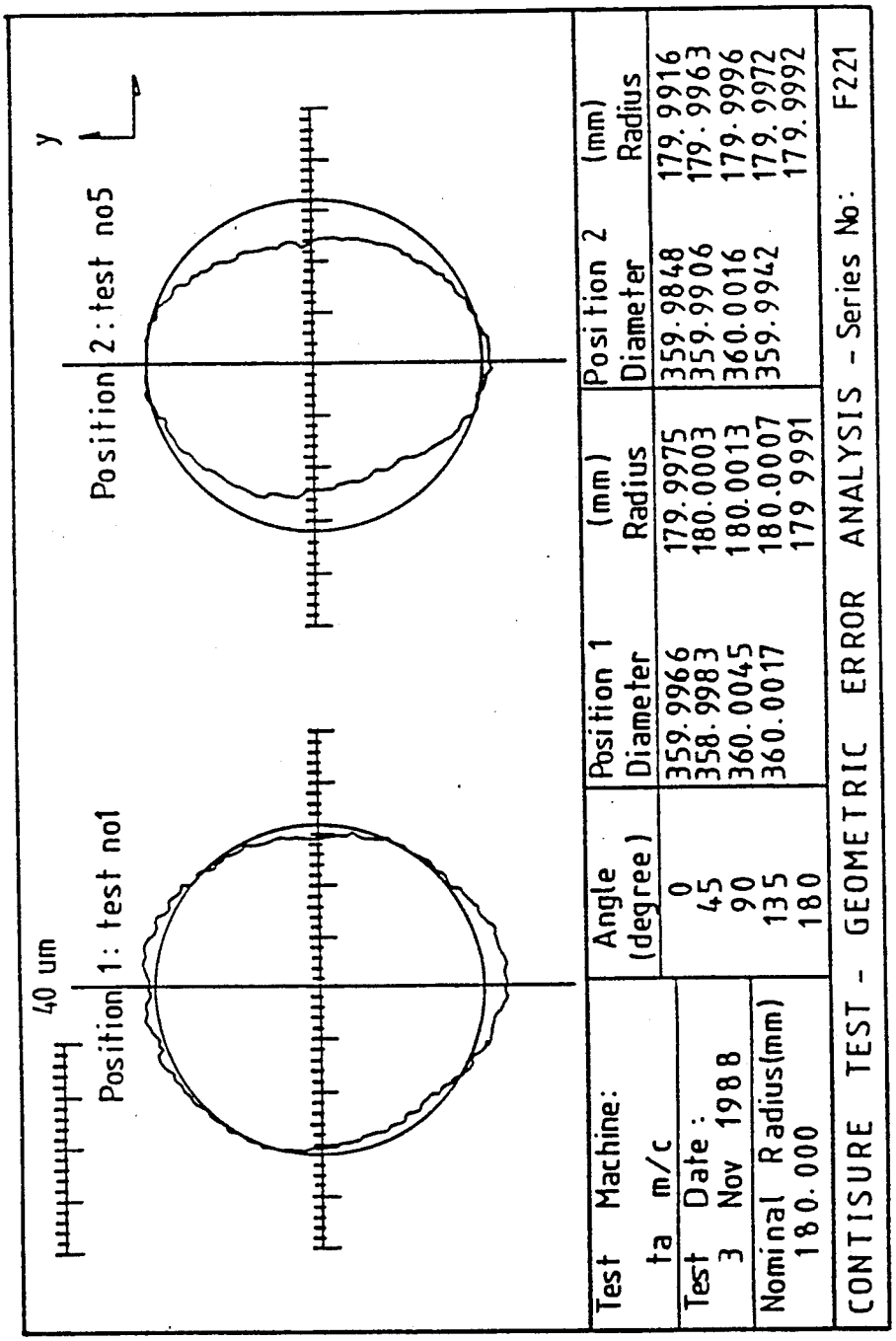
FIGS. 17(a) and (b) show geometry check results in an x-y plane test.
Figure 17B:
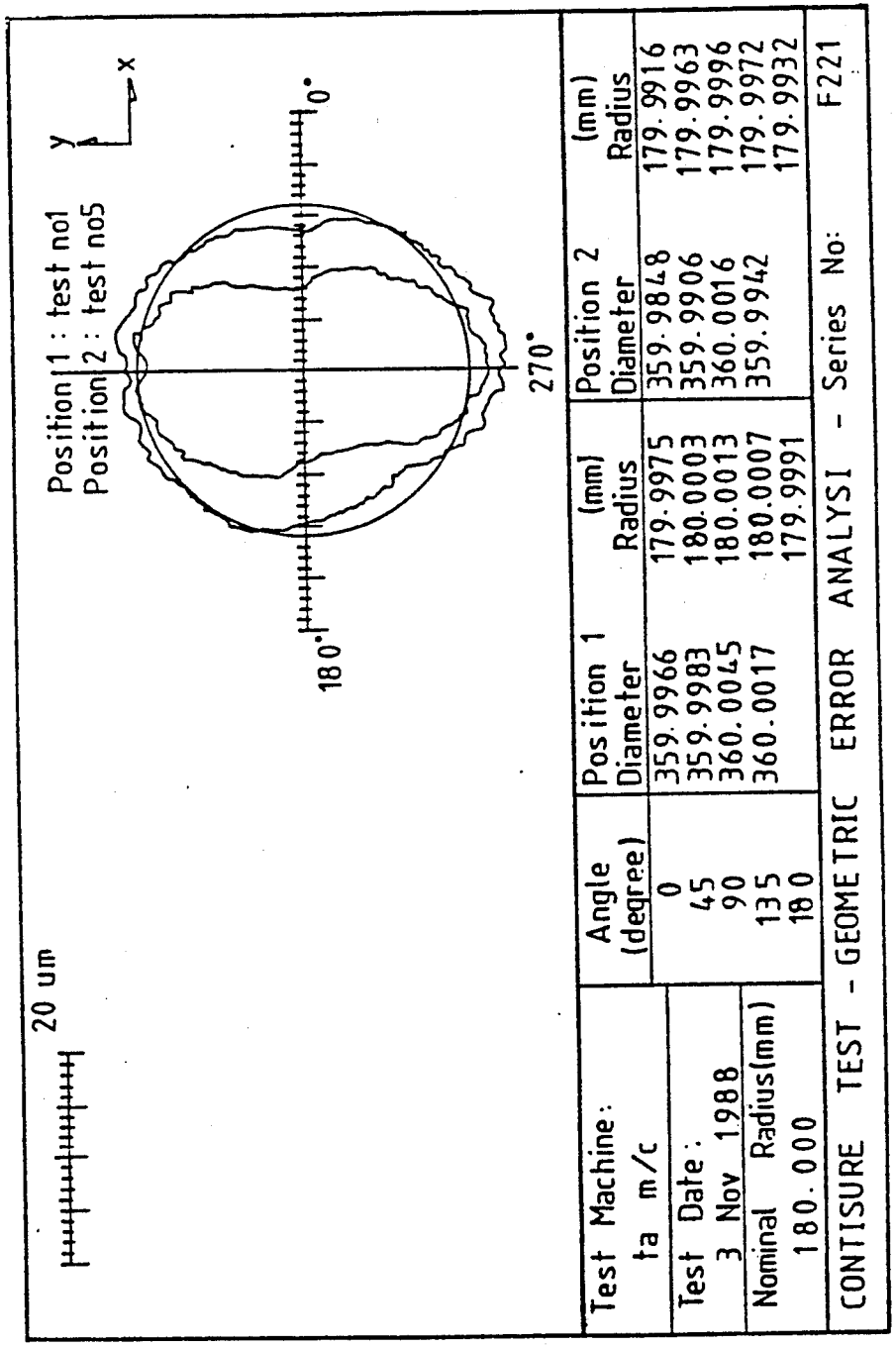
Figure 18:
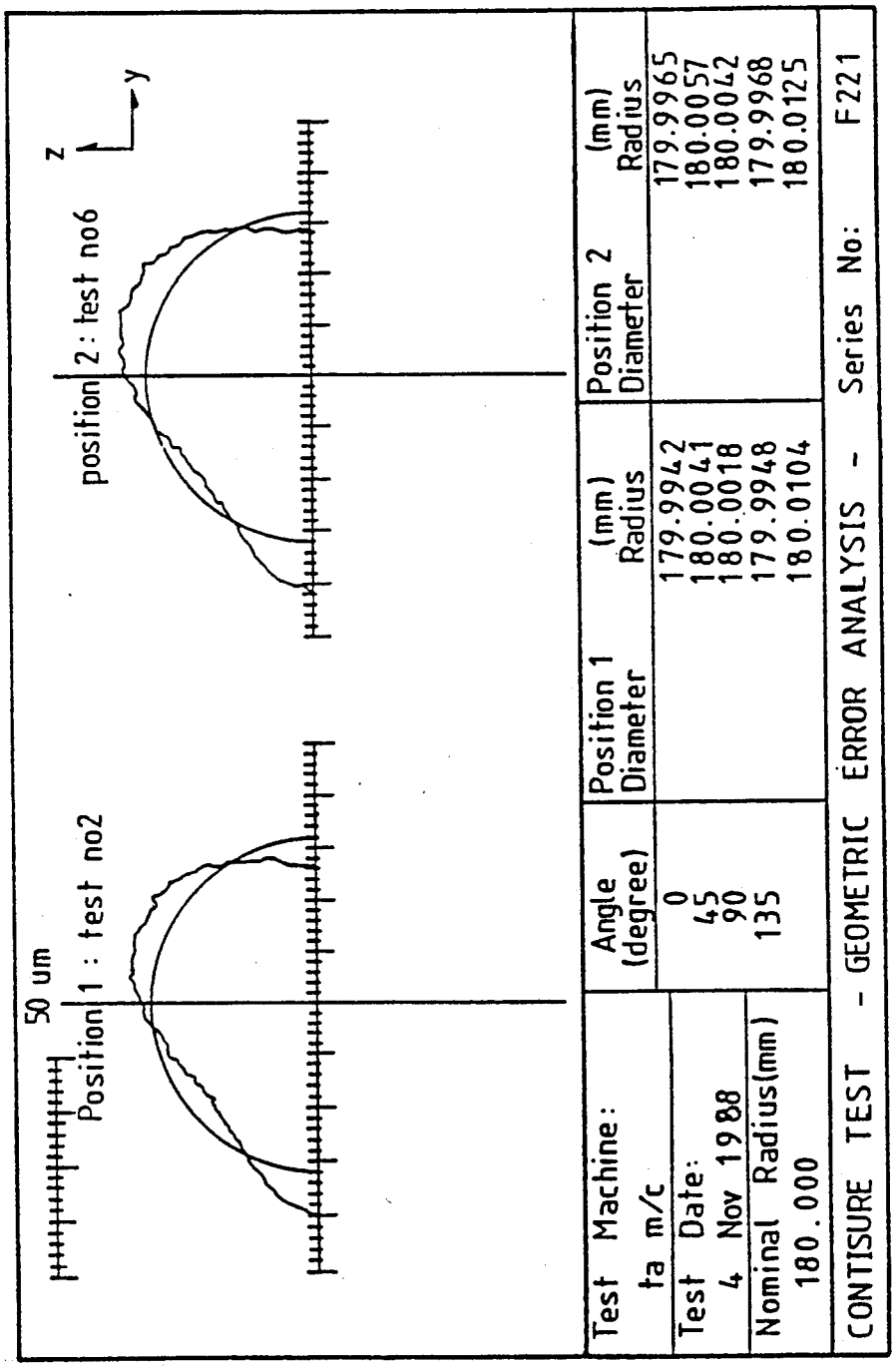
FIG. 18 shows geometry check test results in the y-z plane.
Figure 19:
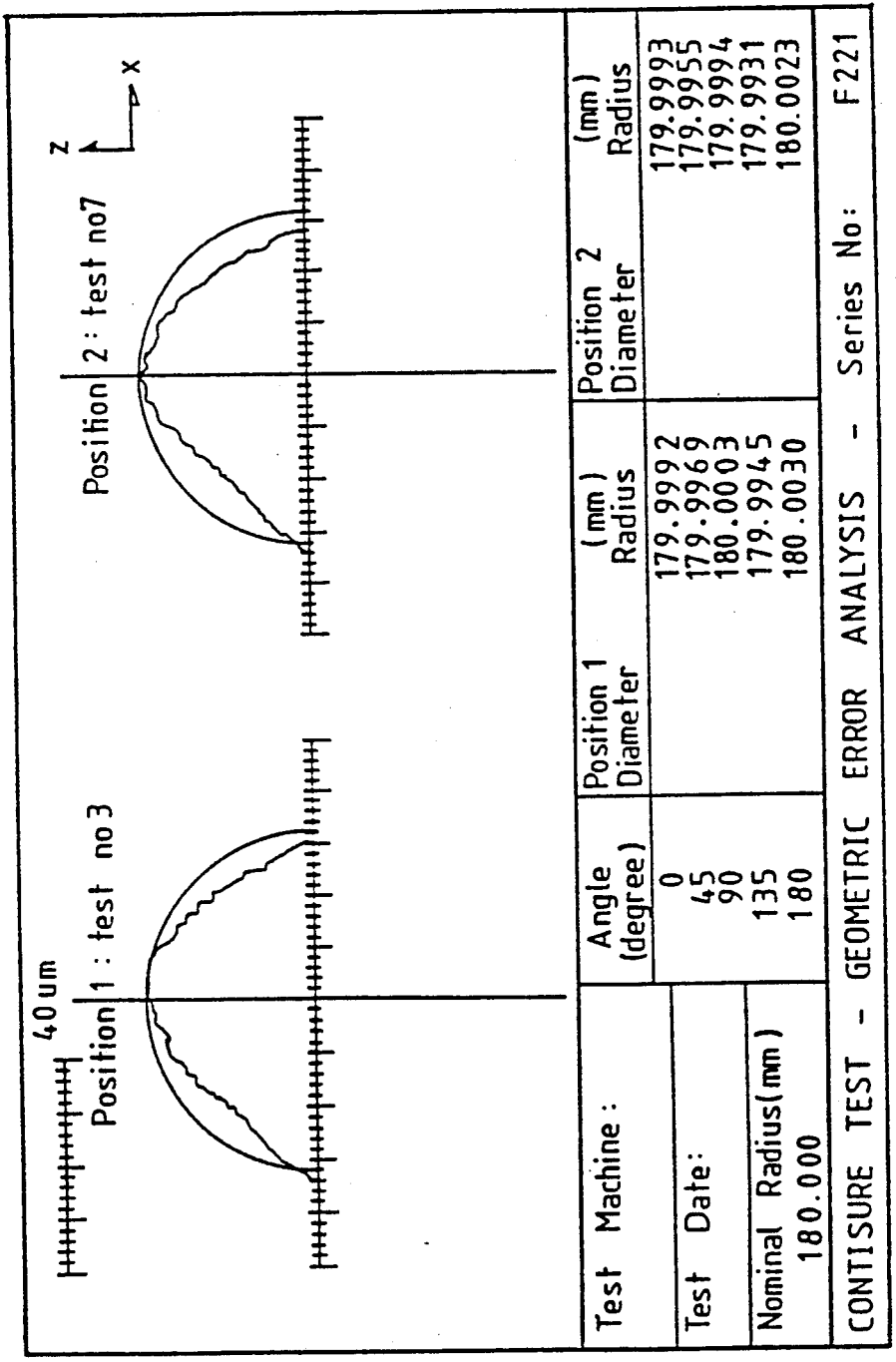
FIG. 19 shows geometry check test results in the x-z plane.

In Table 1, the basic analysis results of the x-y plane are shown, and in FIGS. 17(a) and (b), the contour plot results at two different positions in the x-y plane are shown. FIG. 17(a) and FIG. 18(b) show the same test results, however, in FIG. 17(b), the center of two circular forms are coincident, and the plot size of the errors are magnified by the software for ease of comparing the test results at the two different positions. In FIG. 18 and FIG. 19, the contour plot results of the y-z plane and the x-z plane are shown, respectively.

Geometry Check for each axis

The positioning error, pitch, yaw and roll difference and squareness of each plane can be calculated by comparing the sampled data from different test positions.

The analysis methods used to analyze each error component are summarised in Table 2.

By the application of these error analysis methods, the geometry check of each axis was carried out using the software. In Table 3, the software analysis results for the geometric error check of a machining centre are shown.

TABLE 1

Basic Analysis Results (File No 2211)

1. Initial Set-up Error (coordinates of deviation)
   $x = -1.0\ \mu m$
   $y = 4.8\ \mu m$
2. Out of Roundness
   nominal circle radius = 180.0000 mm
   maximum circle radius = 180.0040
   minimum circle radius = 179.9975
   max r − nominal r / min r − nominal r = 4.01/−2.50 μm
3. Dynamic Positioning Error(lease square radius − nominal radius)
   actual contour radius = 180.0003   pe = −0.4 μm
4. Radius/Diameter Values
   dia at 0°: 359.9966 mm      dia at 45°: 359.9983 mm
       90°: 360.0045                135°: 360.0017
   max. dia. at 99°: 360.0056
   min. Dia. at 15°: 359.9964
   r at 0°: 179.9975 mm         r at 45°: 180.0003 mm
     90°: 180.0013                135°: 180.0007
   180°: 179.9991
5. Non-perpendicularity: −4.10 μm/m

TABLE 2

| Definition of error | Notation | Calulation Method |
|---|---|---|
| Dynamic Position E | pe | r − R (test 1/test 2/ test 3) |
| Position E | | |
| x axis | σy(X) | rad value at 0° − R (test 1) |
| y axis | σy(Y) | rad value at 90° − R (test 1) |
| x axis | σz(Z) | rad value at 90° − R (test 2/test 3) |
| Angular E | | |
| Tilt E | | |
| x axis | φy(X) | 200{(dia value at 0°) (test 5) − (dia value at 0°) (test 1)}/L |
| | φz(X) | 200 {(dia value at 0°) (test 7) − (dia value at 0°) (test 3)}/L |
| y axis | φz(Y) | 200{(dia value at 0°) (test 6) − (dia value at 0°) (test 2)}/L |
| | φx(Y) | 200{(dia value at 90°) (test 5) − (dia value at 90°) (test 1)}/L |
| z axis | φx(Z) | 200{(dia value at 90°) (test 7) − (dia value at 90°) (test 3)}/L |
| | φy(Z) | 200{(dia value at 90°) (test 6) − (dia value at 90°) (test 2)}/L |
| Roll Difference | | |
| x-y plane | φx(X) − φy(Y) | 400{(rad value at 45°) (test 5) − (rad value at 45°) (test 1)}/L − {φy(X) + φx(Y))}/2 |
| y-z plane | φy(Y) − φz(Z) | 400{(rad value at 45°) (test 6) − (rad value at 45°) (test 2)}/L − {φz(Y) + φy(Z))}/2 |
| z-x plane | φz(Z) − φz(X) | 400 {(rad value at 45°) (test 7) − (rad value at 45°) (test 3)}/L − {φx(Z) + φz(X))}/2 |
| Squareness E | | |
| x-z plane | β2 | (rad at 45° − rad at 135°)/r − m (test 2 for y-z plane, test 3 for x-z plane) |
| y-z plane | β1 | |
| x-y plane | α | (dia at 45° − dia at 135°)/2 · r − m (test 1) |

1. E: error, rad: radius, dia: diametre.
   R: nominal rodius, r: least square circle/are redius.
   L: Abbe offset length (m)
   m: maximum longitudinal error (μm/m).
   test 1 . . . 7: contour test position 1 . . . 7 shown in FIG. 6-1.
2. Units
   Radius and Diametre: μm
   Angular Error: arcsec
   Position Error (σx, σy, σz, pe): μm

TABLE 3

|  | X − axis | | Y − axis | | Z − axis | |
|---|---|---|---|---|---|---|
| Positioning Error (μm) | −3.35 | 2.20 | 4.46 | 4.59 | 1.84 | 0.32 |
| Angular Error (arcsec) | | | | | | |

TABLE 3-continued

| | | | |
|---|---|---|---|
| φx | N/A | −3.18 | 7.38 |
| φy | −13.18 | N/A | 4.63 |
| φz | −2.82 | 4.89 | N/A |
| | X Y plane | Y Z plane | X Z plane |
| Dgnamic positioning Error (μm) | 0.35 | 0.32 | −2.36 |
| Roll error difference (arcsec) | −0.37 | 3.16 | −3.70 |
| Squareness Error (arcsec) | −22.39 | 60.20 | −9.01 |
| GEOMETRIC ERROR ANALYSIS | | TEST NO. F221 | |

Basic Profile Evaluation

As already shown in Table 1, the following tolerance checks were possible;
Check of centering error,
Check of roundness error,
Check of diameters,
Repeatability,
Accuracy of interpolation,
Hysteresis,
Dynamic positioning Errors, and
Flatness of the x-y moving plane.

Figure 20:
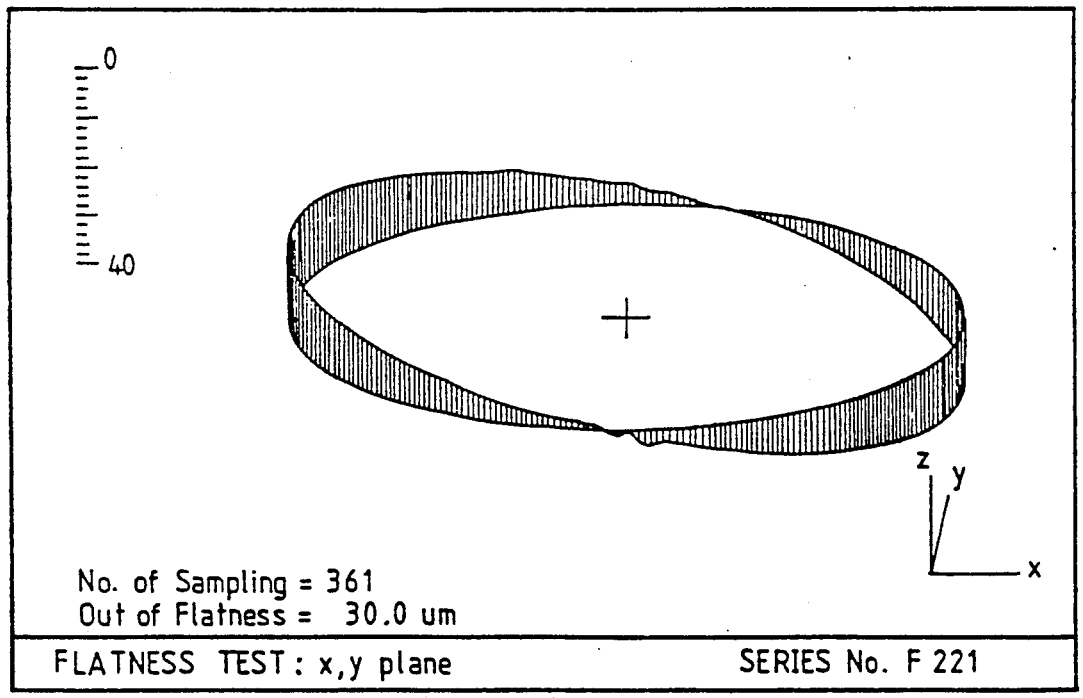
FIG. 20 shows test results of flatness error.

Flatness of the x-y moving plane during the contouring in the x-y plane is evaluated by carrying out two different position tests using different sizes of kinematic as shown in FIG. 20.

A summary of the analysis of the Geometry Check test results for the Takisawa vertical machine centre are as follows:

1. out of roundness: −2.5 μm/4 μm (6.5 μm)
2. dynamic positioning error: 0.4 μm (x-y plane)
3. positioning error (test length: 180 mm)
   x axis: −0.6 μm
   y axis: 4.5 μm
   z axis: 1.1 μm
4. squareness
   x-y plane: −22 μm/m
   y-z plane: 60 μm/m
   z-x plane: −9 μm/m
5. pitch and yaw error
   φy(X): −13.2 arcsec
   φz(X): −2.8 arcsec
   φx(Y): −3.2 arcsec
   φz(Y): 4.9 arcsec
   φx(Z): 7.3 arcsec
   φy(Z): 4.6 arcsec
6. difference of roll in
   x-y plane: −0.4 arcsec
   y-z plane: 3.2 arcsec
   x-z plane: −3.7 arcsec These values are valid for a travel of 180 mm radius of contour path, at a contouring speed of less than 10 mm/sec. at the centre of the x-y table and at a height of between 50 mm and 230 mm from the machine table.

EXAMPLE 2

N.C. and Drive Check Test

1. Scope

A quick check of the N.C. system, the adjustment of a parameter of the numerical control and drives and the investigation of the influence of special parameter changes of the N.C. control system are possible by carrying out several tests at different contouring speeds.

It is desired to first determine the maximum contouring speed. By changing the contouring speed, the circular deviation can be detected depending on the speed and acceleration of a single machine axis. From the results of these tests, the maximum possible speed and acceleration can be established to enable the contouring accuracy to be within the specified tolerance.

It is also desired to recognize the mismatching of servo gains. The contour test cannot detect the absolute value of the velocity error caused by the mismatched gains of the control loop. Only the difference between two velocity errors are recognized.

The contour test can be used to optimize loop gain and adjust the velocity errors of all axes to identical values.

2. Procedure

The set-up and data sampling procedure of the N.C. check test was identical to the 'Basic Profile Test' however, separate software called 'N.C. Check Test' was developed to simplify data sampling for different velocity tests (by name of automatic procedure) and analysis of mismatching of the feed drives. The most significant parameters for checking of N.C. system and drives was contouring speed, i.e., the same radius contour with different contouring velocity (from 1–33 mm/sec) should be carried out.

The minimum size of kinematic transducer link is selected to minimize the effect from geometric errors. A kinematic link of 100 mm length was used for testing of the Takisawa machining centre.

3. Evaluation of the N.C. and Drive Check Test Results

The evaluation results of the contour test with contouring arcs/circle path was presented on the monitor by execution of 'N.C. check test' program. The general input data for the 'N.C. check test' program were similar to the 'Basic profile test' program.

Input Data

Test machine name, test date, test series number,
Test condition: velocity of measurement (contouring speed), direction of measurements, measurement range: measurement start/finish angle, measurement plane (e.g. xy plane), contouring radius (radius of kinematic link)

Analysis of Results

Figure 21A:
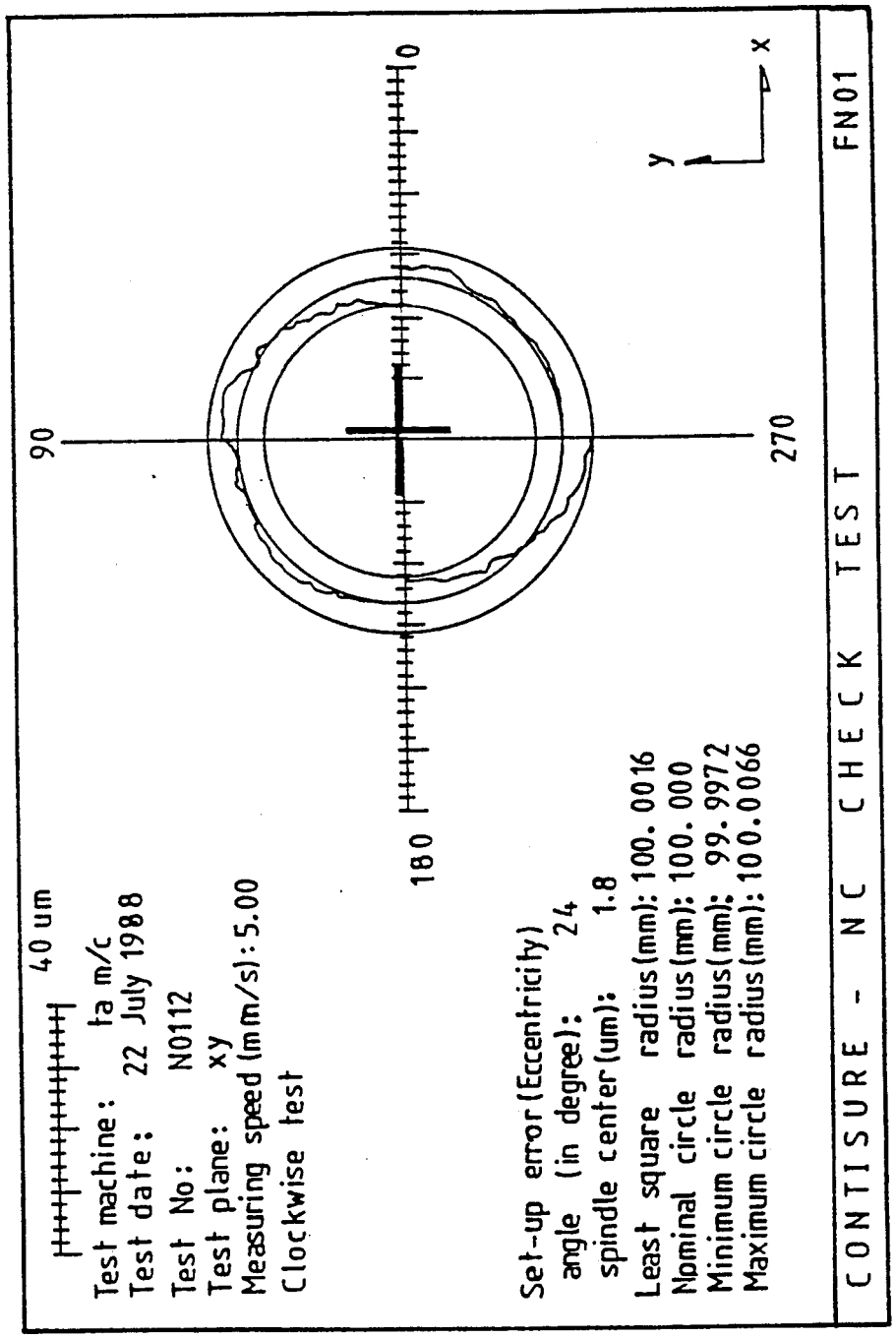
FIGS. 21(a) and (b), 22(a) and (b), and 23(a) and (b) represent examples of the plots of the contour path at different contour speeds.
Figure 21B:
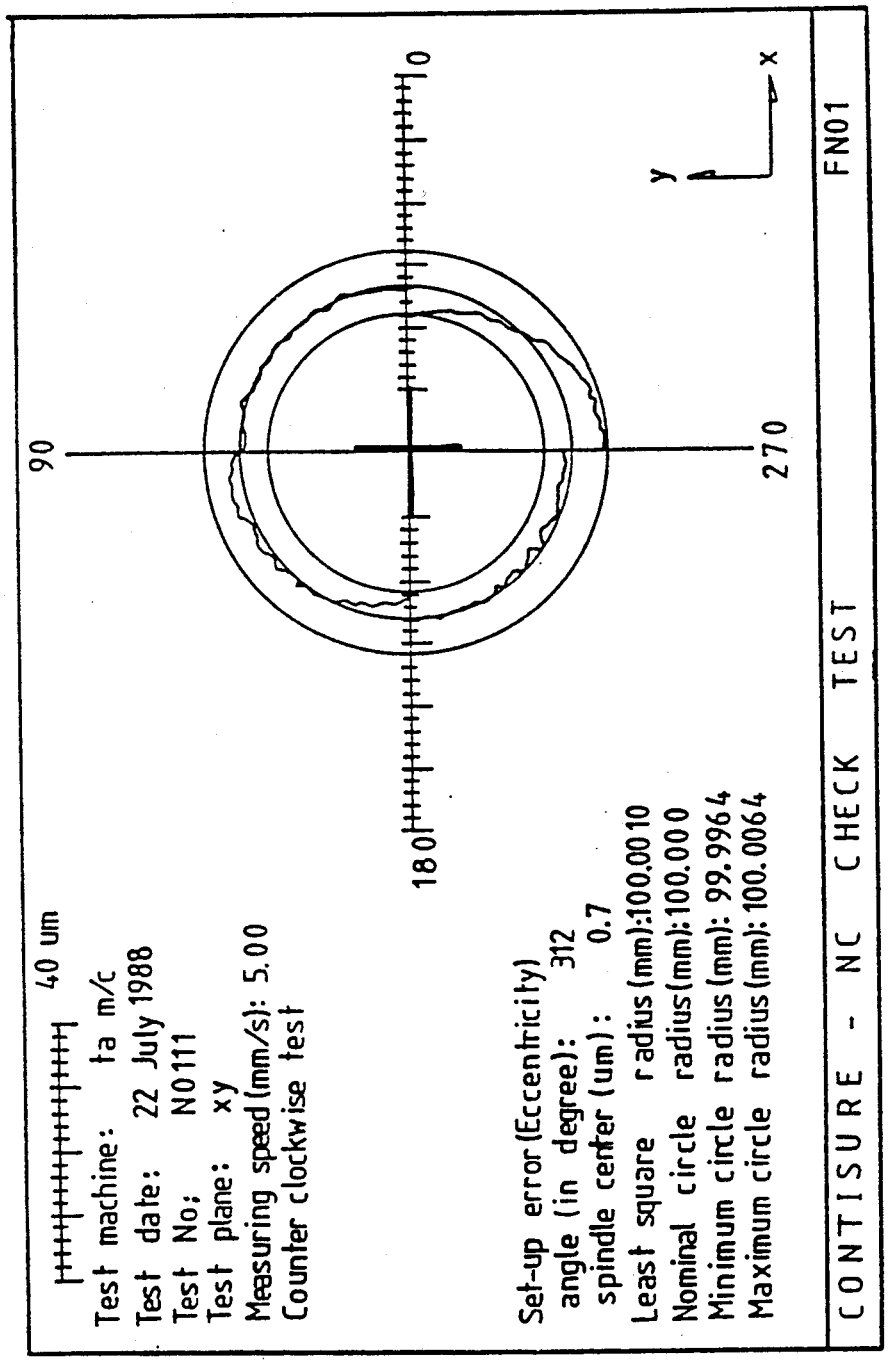
Figure 22A:
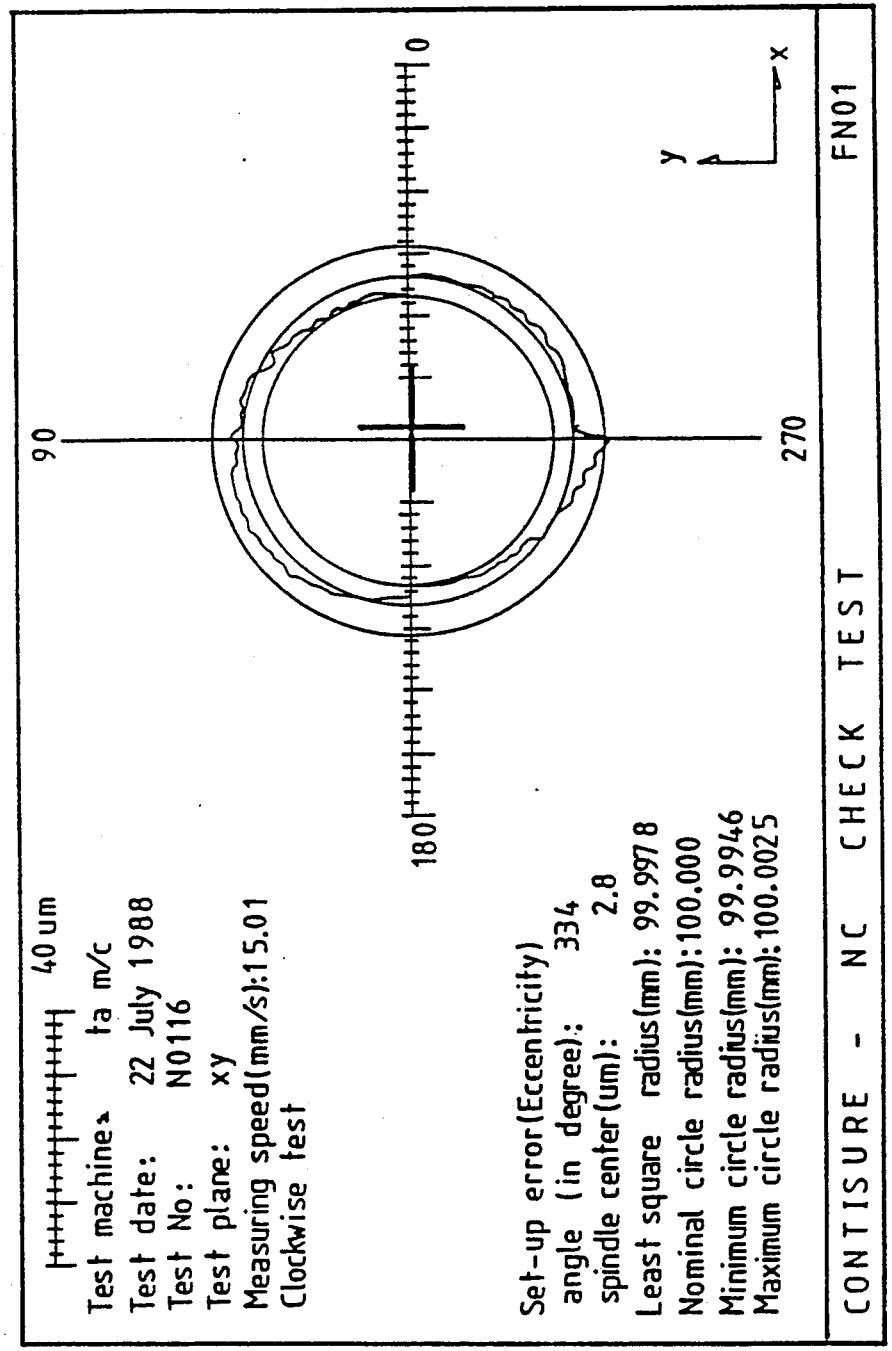
Figure 23A:
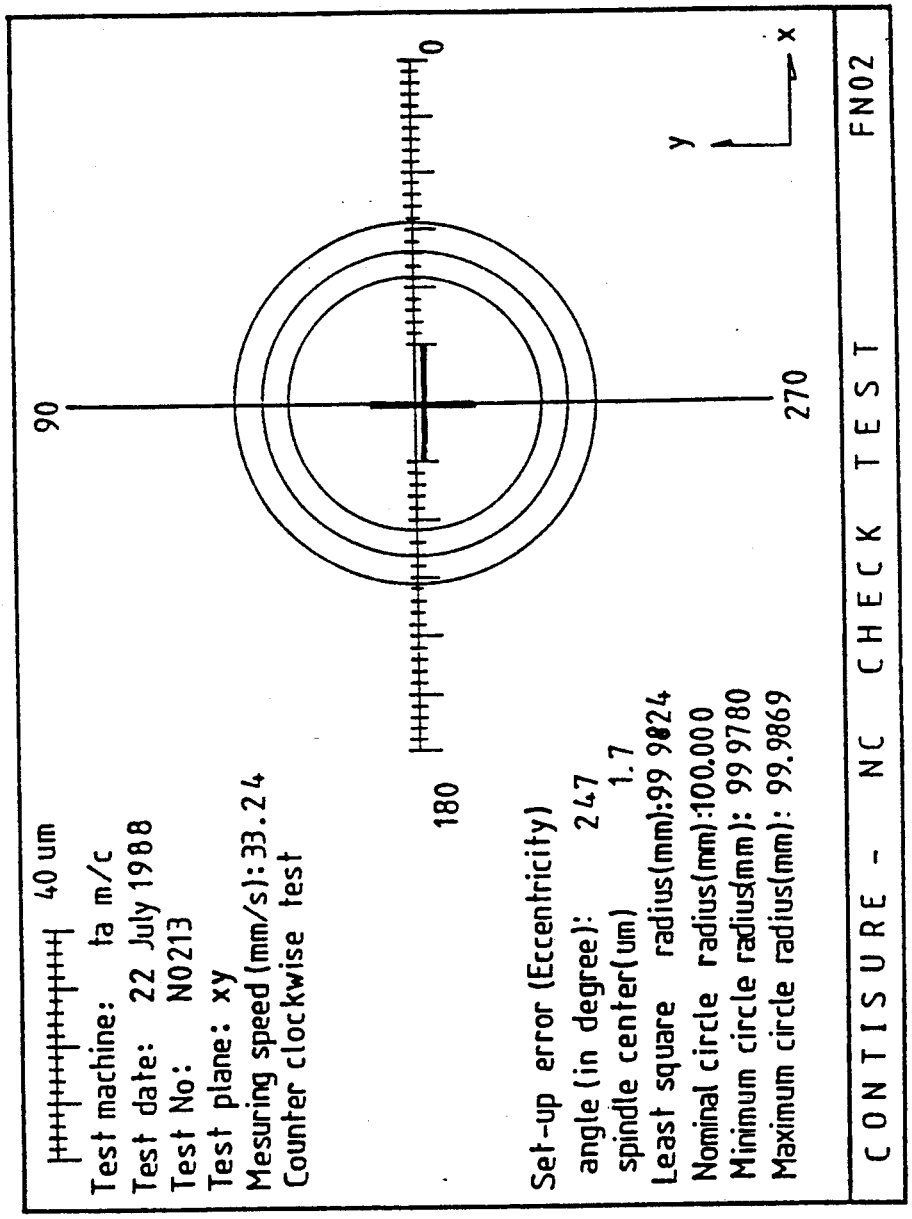

The basic numerical evalution of the N.C. check test results is shown in Table 4, and examples of the plots of the contour path at different contour speeds are shown in FIG. 21 (a) and (b), FIG. 22(a) and (b), and FIG. 23(a) and (b).

Basic Profile Evaluation

The following results were obtained by basic evaluation (to see Table 4) check centering error, check roundness error, check diameters, accuracy of interpolation, hysteresis (see FIGS. 21(a) and (b)), least squares radius (actual contouring radius) and different velocity error.

Servo Response Error

Figure 22B:
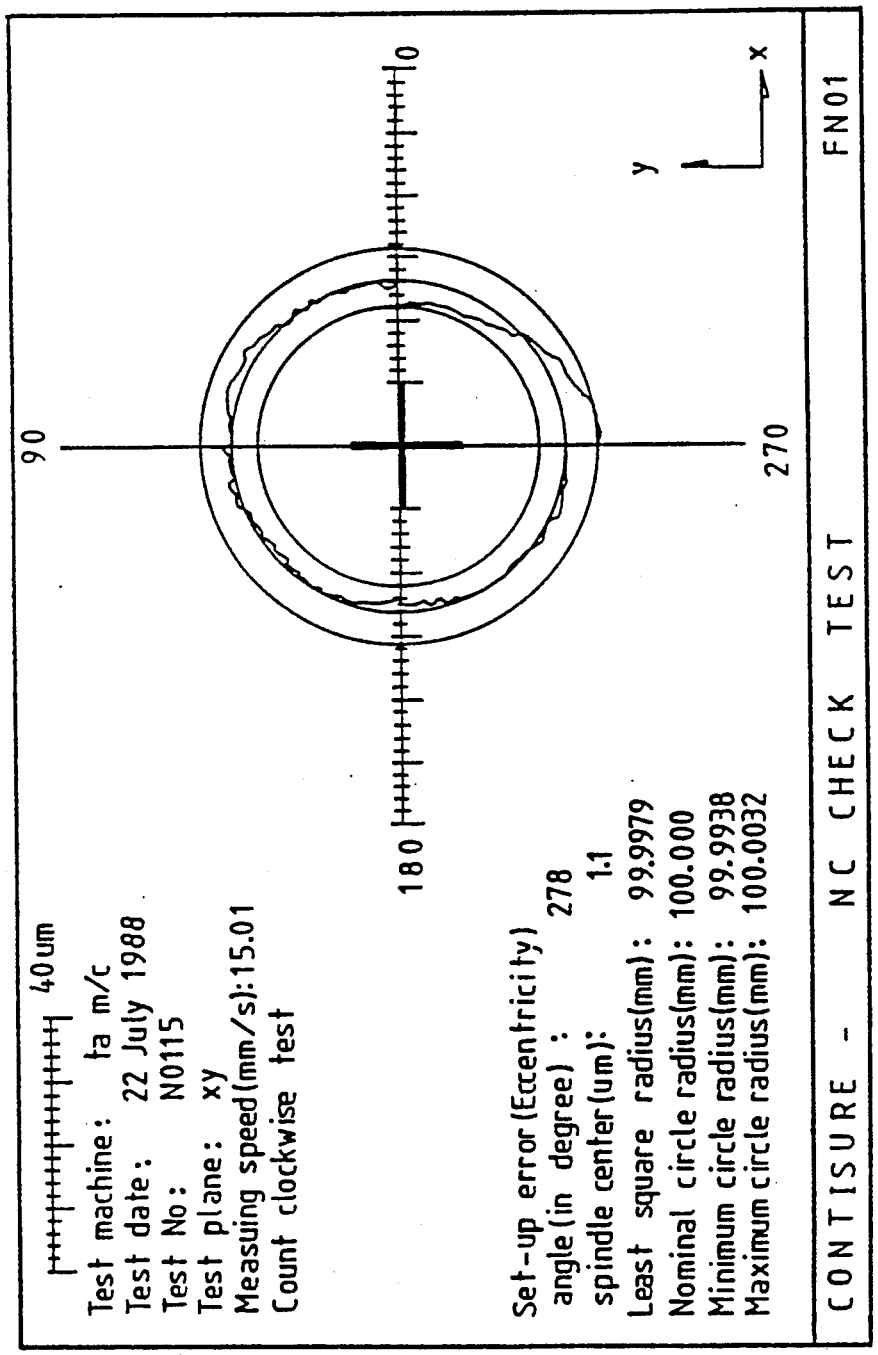
Figure 23B:
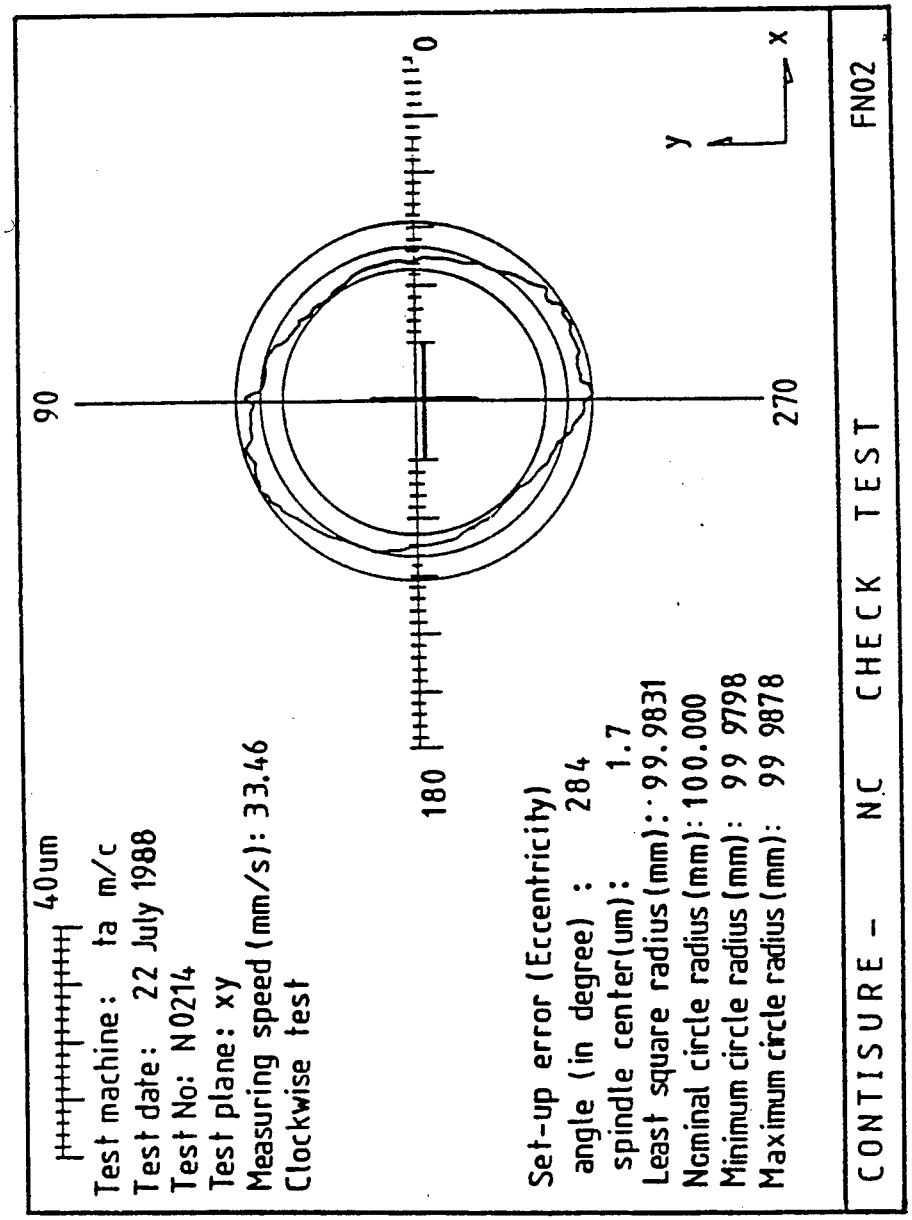

The least squares radius of the contour results decreased as the contouring speed was increased, and it was the result of velocity error of the feed drives due to servo response. Comparison of the least squares radius obtained at different speeds are shown in FIGS. 21 to FIG. 23. From FIGS. 21 and FIG. 23, a maximum of 19 μm (100.0010–99.9824 mm) of servo response error was detected.

Mismatch of Servo gains

As shown in the above figures and tables, when the contouring speed was low, velocity feed back was not significant and the different velocity error was about 1 μm (see Table 4(A)). Therefore mismatch of two axis gains could not easily be detected on the contour paths as shown in FIGS. 21(a) and (b). However, on fast contouring such as at a speed of 33 mm/secs as shown in FIG. 23(a) and (b), mismatch of servo gains were clearly seen. The difference in velocity error at this velocity was about 5 μm (see Tables 4(C) and (F)). The value of this error for bi-direction tests (F) was obtained as follows:

$$F = \{(D + 45(ccw) - D - 45(ccw))\} - \{(D + 45(cw) - D - 45(cw))\}/4$$
$$= \{(199.9696 - 199.9584) - (199.9605 - 199.9706)\}/4$$
$$= (0.0112 + 0.0101)/4$$
$$= 0.005325 \text{mm} = 5.3 \mu m$$

where
D+45: diameter at 45 degrees(mm)

TABLE 4

(A) Basic Evaluation (NC Check) FN 0111
Contouring Speed: 5.0 mm/sec (300.0 mm/min)

1. Initial Set-up Error (x,y,z coordinates of deviation)
   x = 0.5 μm     y = −0.5 μm
2. Out of Roundness
   nominal circle radius = 100.0000 mm
   max radius-nominal radius/min
   radius-nominal radius: 6.4/−3.6 μm
3. Actual contour radius = 100.0010 mm
4. Diametre Values
   0°: 200.0001 mm     45°: 200.0018 mm
   90°: 200.0037       135°: 200.0025
5. Different Velocity Error: −0.3 μm (B) Basic Evaluation (NC Check) FN 0115
Contouring Speed: 15.0 mm/sec (900.0 mm/min)

1. Initial Set-up Error (x,y,z coordinates of deviation)
   x = 0.2 μm     y = −1.1 μm
2. Out of Roundness
   nominal circle radius = 100.0000 mm
   max radius-nominal radius/min
   radius-nominal radius: 3.2/−6.2 μm
3. Actual contour radius = 99.9979 mm
4. Diametre Values
   0°: 199.9947 mm     45°: 199.9972 mm
   90°: 199.9967       135°: 199.9931
5. Different Velocity Error: 2.1 μm (C) Basic Evaluation (NC Check) FN 0213
Contouring Speed: 33.2 mm/sec (1994.7 mm/min)

1. Initial Set-up Error (x,y,z coordinatus of deviation)
   x = −0.6 μm    y = −1.5 μm
2. Out of Roundness
   nominal circle radius = 100.0000 mm
   max radius-nominal radius/min
   radius-nominal radius: −13.1/−22.0 μm
3. Actual contour radius = 99.9824 mm
4. Diametre Values
   0°: 199.9675 mm     45°: 199.9696 mm

TABLE 4-continued
   90°: 199.9664       135°: 199.9584
5. Different Velocity Error: 5.6 μm (D) Basic Evaluation (NC Check) FN 0112
Contouring Speed: 5.0 mm/sec (300.0 mm/min)

1. Initial Set-up Error (x,y,z coordinatus of deviation)
   x = 1.6 μm     y = 0.7 μm
2. Out of Roundness
   nominal circle radius = 100.0000 mm
   max radius-nominal radius/min
   radius-nominal radius: 6.6/−2.8 μm
3. Actual contour radius = 100.0016 mm
4. Diametre Values
   0°: 199.9951 mm     45°: 200.0023 mm
   90°: 200.0061       135°: 200.0048
5. Different Velocity Error: −1.3 μm (E) Basic Evaluation (NC Check) FN 0116
Contouring Speed: 15.0 mm/sec (900.9 mm/min)

1. Initial Set-up Error (x,y,z coordinatus of deviation)
   x = 1.8 μm     y = −0.9 μm)
2. Out of Roundness
   nominal circle radius = 100.0000 mm
   max radius-nominal radius/min
   radius-nominal radius: 2.5/−5.4 μm
3. Actual contour radius = 99.9978 mm
4. Diametre Values
   0°: 199.9912 mm     45°: 199.9923 mm
   90°: 200.0002       135°: 199.9979
5. Different Velocity Error: −2.8 μm (F) Basic Evaluation (NC Check) FN 0214
Contouring Speed: 35.5 mm/sec (2007.4 mm/min)

1. Initial Set-up Error (x,y,z coordinatus of deviation)
   x = 0.4 μm     y = −1.7 μm
2. Out of Roundness
   nominal circle radius = 100.0000 mm
   max radius-nominal radius/min
   radius-nominal radius: −12.1/−20.2 μm
3. Actual contour radius = 99.9831 mm
4. Diametre Values
   0°: 199.9641 mm     45°: 199.9605 mm
   90°: 199.9713       135°: 199.9706
5. Different velocity Error: −5.1 μm D-45: diameter at −45(135) degrees(mm)

Compensated Hysteresis

Figure 24A:
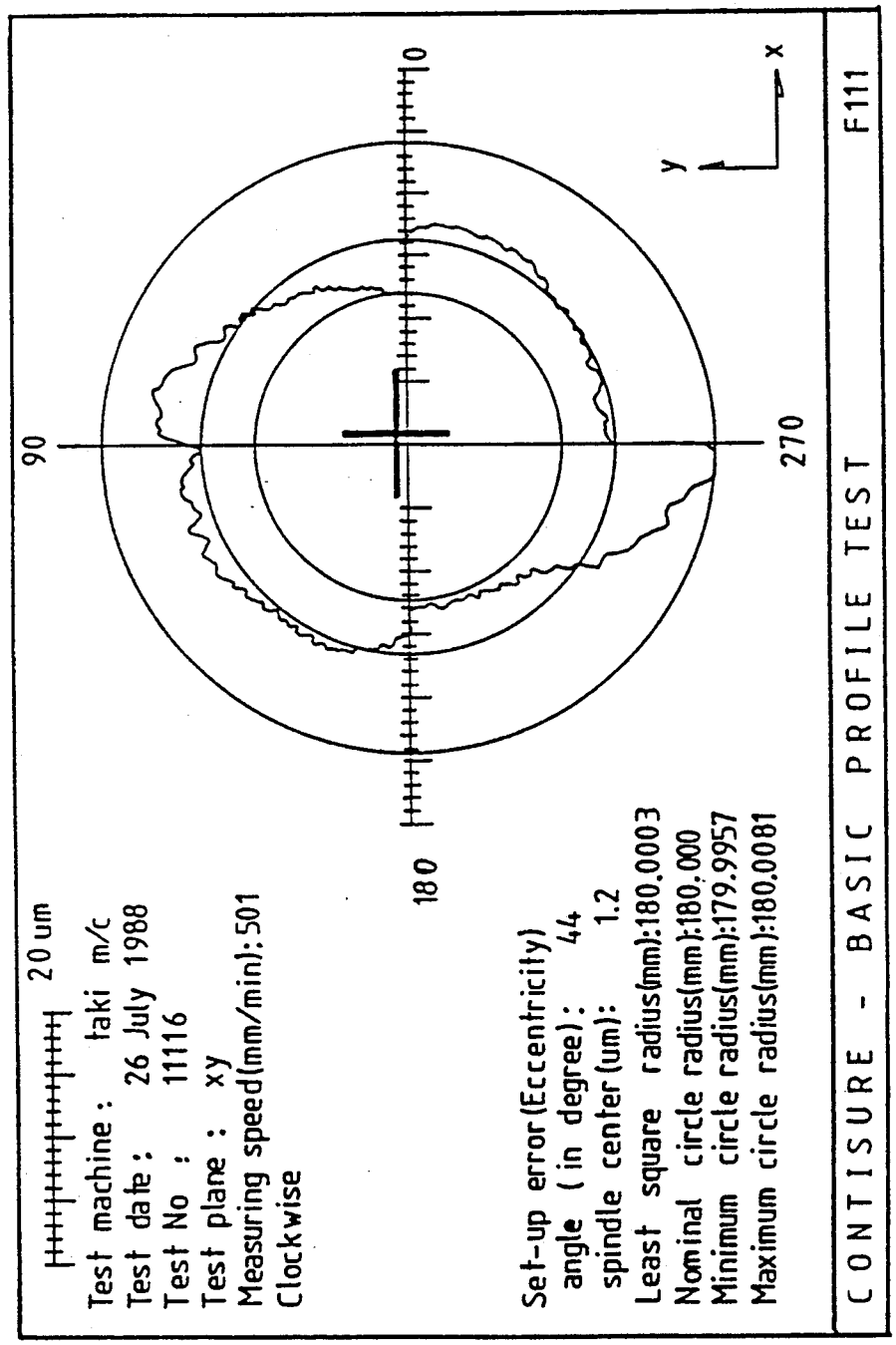
FIGS. 24(a) and (b) represent test results of non-compensated and compensated hysteresis of the x-y plane, respectively.
Figure 24B:
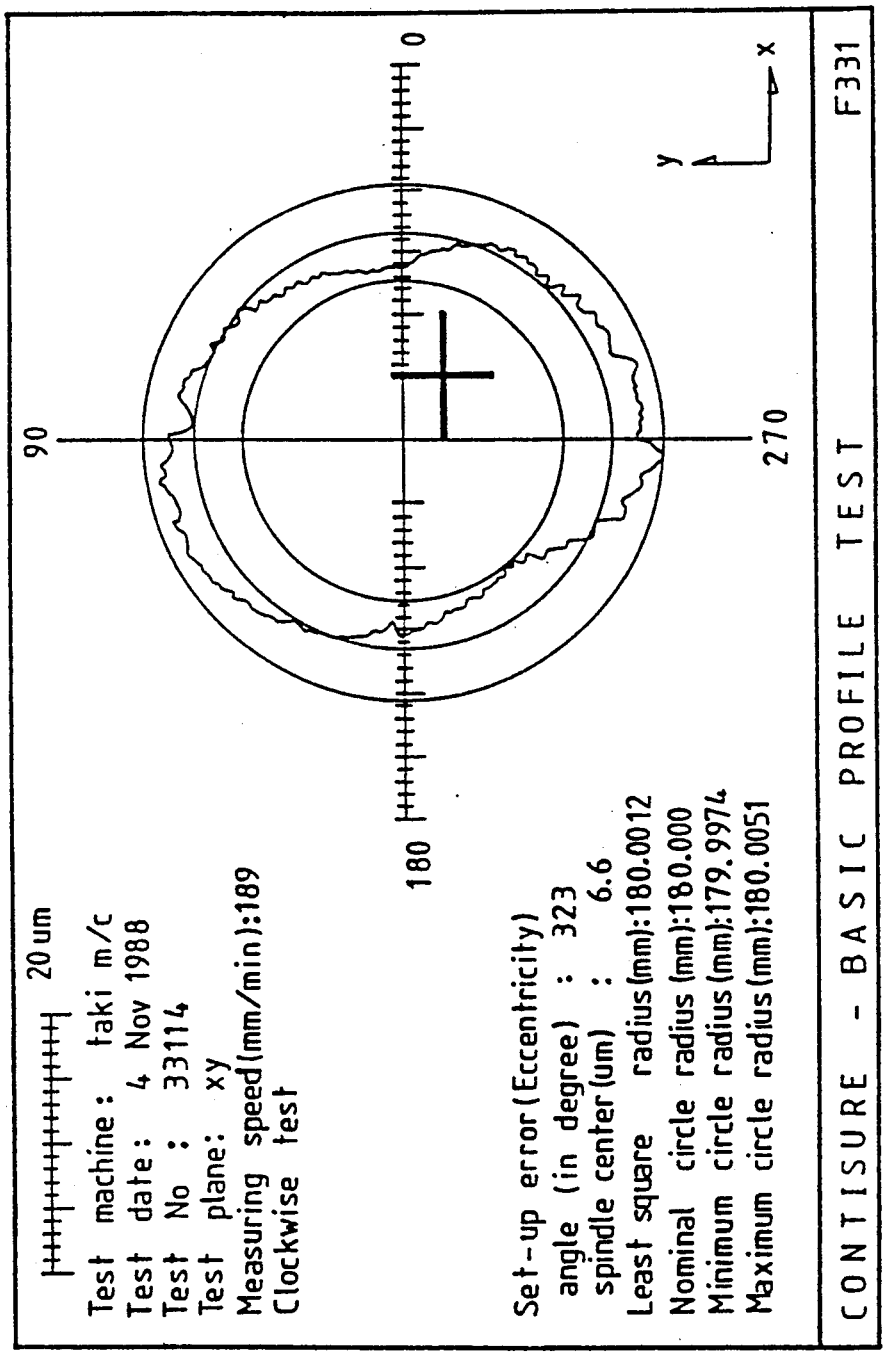
Figure 25:
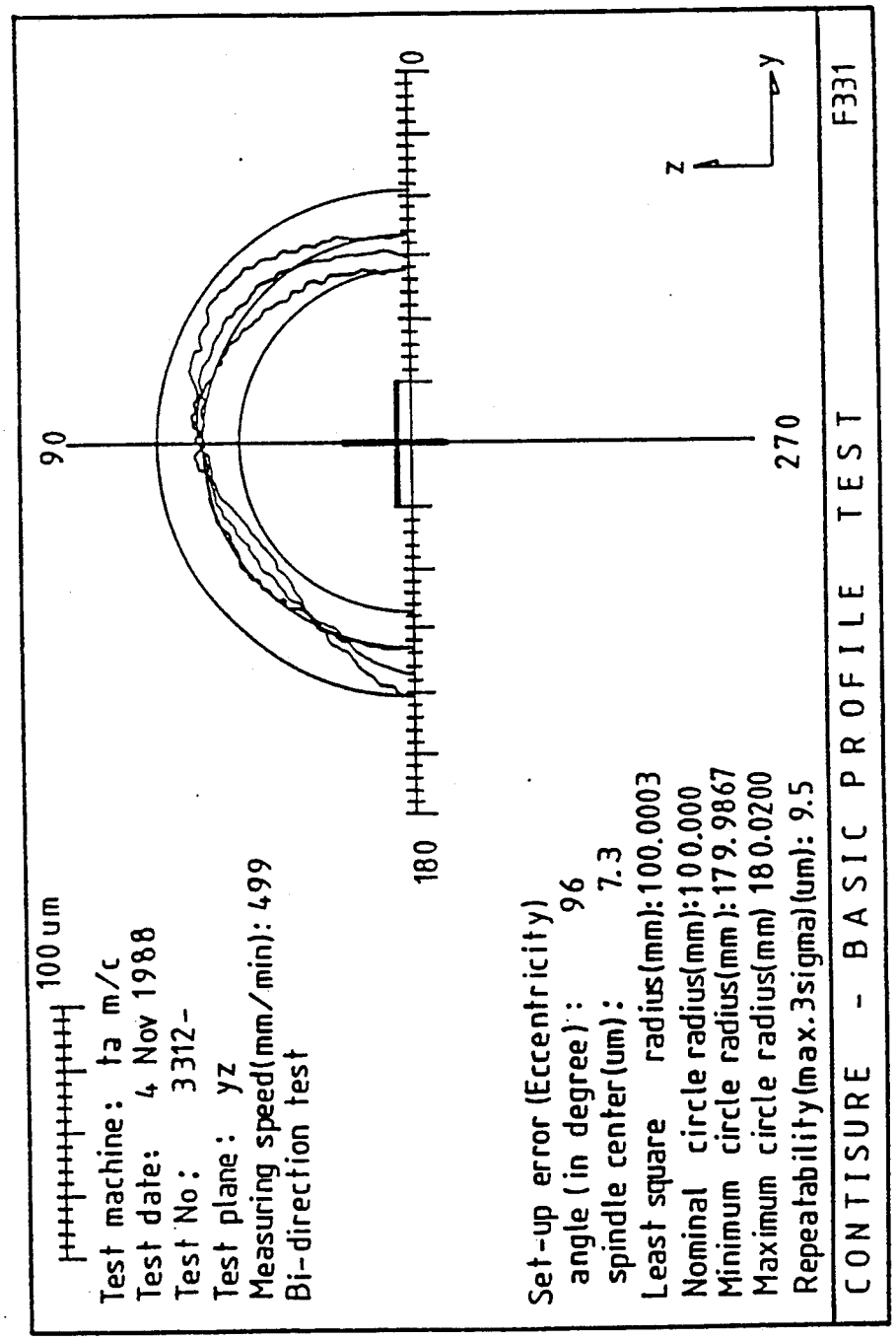
FIG. 25 represents test results of compensated hysteresis of the y-z plane.
Figure 26A:
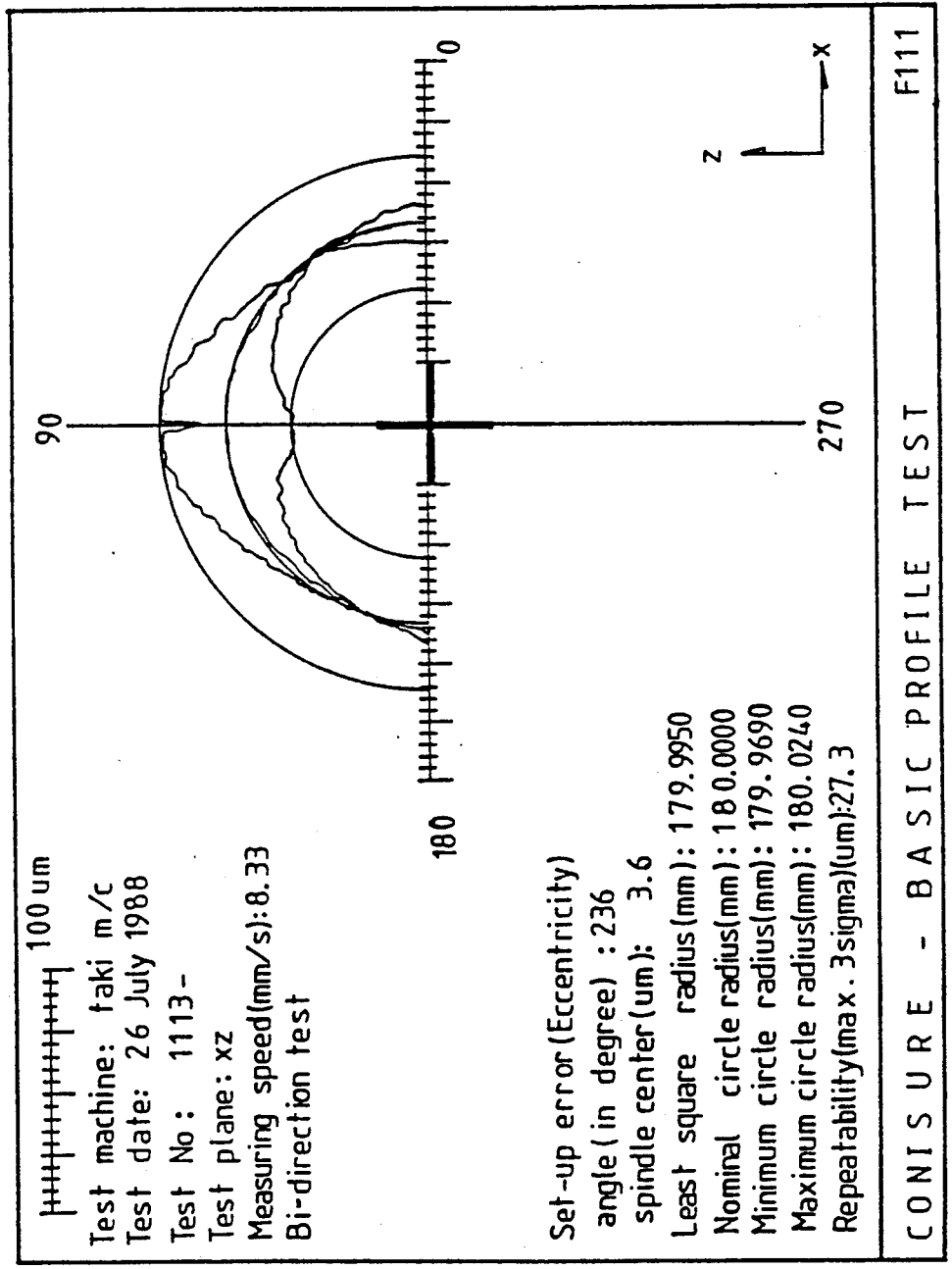
FIGS. 26(a) and (b) represent test results of non-compensated and compensated hysteresis of the z-x plane, respectively.
Figure 26B:
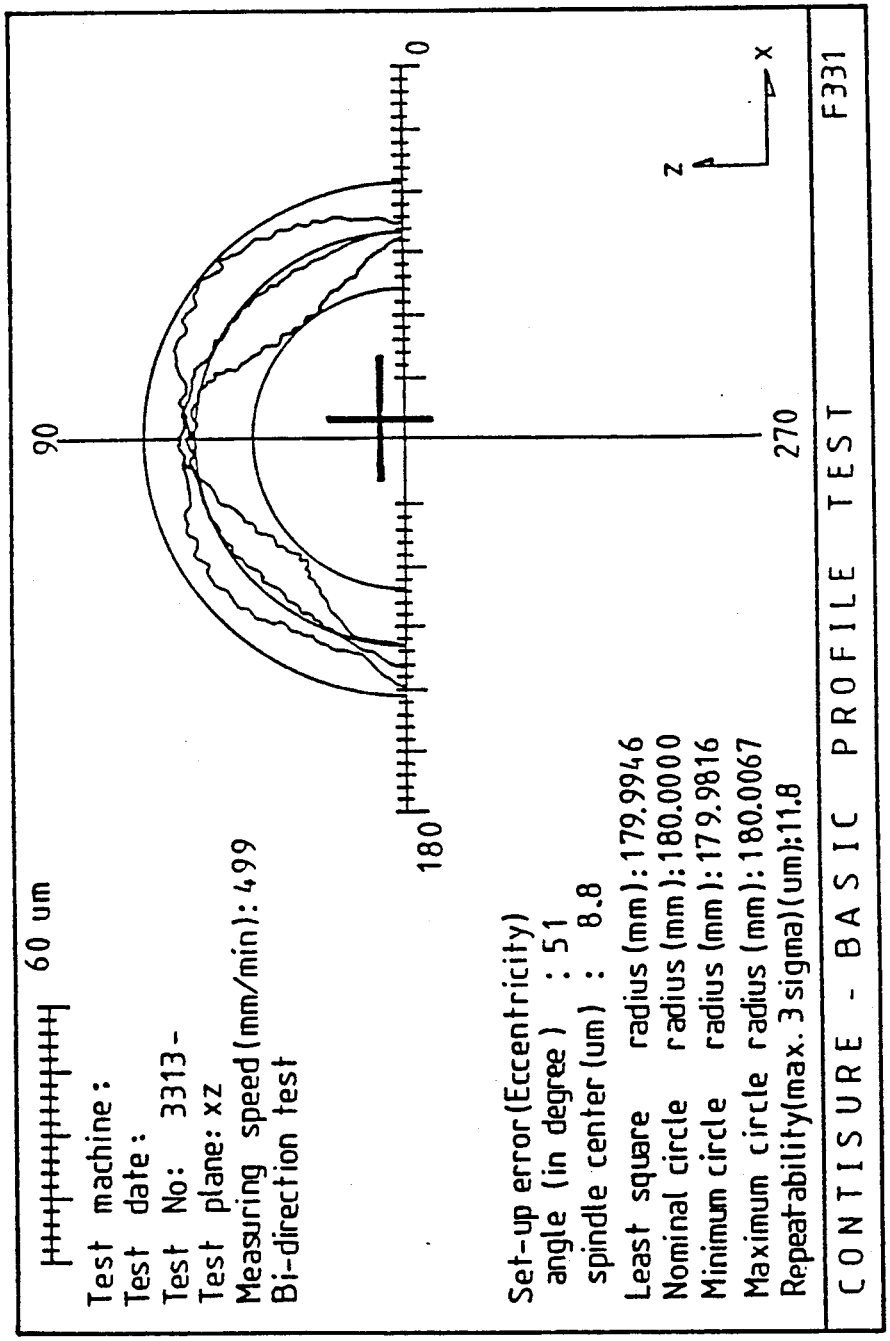

The hystereses (lost motion error) values of the axes were compensated by changing the compensation parameter values in the N.C. controller of the machine tool. In FIGS. 24(a) and (b), examples of contour test results for non-compensated and compensated hystereses of 3 μm in the x axis direction and 8 μm in the y axis direction, are shown. As shown in those figures, the sharp step change at the reversal positions of each axis was eliminated. However in the y axis, the 90 degrees position values were over compensated because the hysteresis value at both ends of the axis was different. FIG. 25 and FIG. 26(b) show the repeatability test results of y-z and x-z plane, respectively, after compensation of the z axis hysteresis value of 20 μm from FIG. 26(a). These results as shown below showed that contouring accuracy can be improved considerably by the compensation of hystereses.

|  | Non-compensated hys. | Compensated hys. |
|---|---|---|
| CR μm (\|CR\|) | | |
| x-y plane | 37.5 | 18 |
| y-z | 58.9 | 33.3 |
| x-z | 55 | 25.1 |
| Repeatability (3σ) (μm) | | |
| x-y plane | 18.7 | 10.2 |
| y-z | 28.2 | 9.5 |

-continued

| | Non-compensated hys. | Compensated hys. |
|---|---|---|
| x-z | 27.3 | 11.8 | where CR:

|minimum r−nominal r| + |maximum r−nominal r|

The results of the N.C. and drives check test of the Takisawa vertical machine centre are summarized as follows:
1. velocity error due to servo response (at feedrate of 33 mm/sec)
2. mismatching of servo gains in x-y plane (at feedrate of 33 mm/sec)
3. hystereses:

| | | Noncompensated | Compensated |
|---|---|---|---|
| CR (μm) | (|CR|) | | |
| x-y plane | | 15.2 + 22.3(37.5) | 8.2 + 9.8(18) |
| y-z | | 28.5 + 30.4(58.9) | 13.3 + 20.0(33.3) |
| x-z | | 31.0 + 24.0(55) | 18.4 + 6.7(25.1) |

EXAMPLE 3

Thermally Induced Error Check Test

1. Scope

Thermally induced error is one of the most significant factors influencing workpiece accuracy. It is not always easy to measure because it is slowly varying with time and usually related to the structure of the machine tool itself. For detecting this quasi-static error, testing time should be short and a multi dimensional test method is preferable. However there is no conventional method to meet this requirements.

'The JP System' is computer aided, simple, fast and a three dimensional test method, which can also give a quick check of geometrical deformation due to thermally induced distortion between the workpiece and tool positions. Especially for recognizing the influence of internal temperature change, a fast test method is essential, otherwise temperature changes during the measurement will influence the test results. For this reason, the 'JP system' contour test is an effective method for thermally induced error checking. Therefore, the 'JP system' contour test was applied to geometrical tests under thermal loads to analyze the influence of thermally induced error on machine tool accuracy.

Tests should be carried out over a period of several hours under continuous machine operation and the influence of the thermal effect measured by repeating the measurements after a certain time interval.

The basic principle of the 'British Standard draft for assessing the effect of thermal distortion of machine tools' (2nd revision), AMTRI, May, 1988, was adapted for these tests. This draft describes methods of assessing the contribution to workpiece inaccuracy arising from the thermal behavior of the machine due to internal heat sources and the resulting distortion of the structure and drift of the drives.

Since the change in temperature of the basic machine units caused through the machine operation may result in geometrical displacement at the place of machining, the temperature behaviour and a resulting relative displacements between tool and workpiece should be established. Where a machine involves rotating both the workpiece and tool on two sepatate spindles, the test should be carried out for both spindles with respect to a common fixed point.

Several repetitive 'Contisure' tests can quantify the effects on positioning accuracy repeatability of thermal expansion and contraction of the axis drives. In general, a laser reflector and remote interferometer are necessary to measure the distance traversed by the moving part of the axis under test. This test should be performed as quickly as possible and is not easy for a conventional method. However, using the 'Contisure' test with the machine loaded at a rapid feed rate, not only thermal drift of a single axis drive, but also the thermal drift of two drives axes can be easily performed and evaluated.

The draft British Standard mentioned above states that all axes should remain stationary except the main spindle during the test of thermal distortion of the structure. However, in practice, it seems that axes should move continuously to simulate the actual thermal distortion of the full structure and drives during the contour motion. Therefore contour test measurements with the machine load representing general contour operations should also be carried out to investigate the actual thermal behavior during contouring operations.

2. Test Procedure

The set up and data sampling procedure of the thermally induced error check test is identical to the 'Basic Profile Test'. However, the same test condition data sampling was repeatedly carried out every 5-20 minutes over the complete testing time. Between each test interval, the being tested was moved as determined machine by the load type. Ambient temperature during the test period was also continuously measured and recorded in each test data file. After the continuous test, the machine was allowed to cool down, for a minimum period of two hours prior to carrying out the final measurement.

Three different types of thermal load had to be taken into consideration during thermal tests.

Machine load type 1

1. thermal loading of a machine tool through a constant idle running speed of the main spindle of $n = n_{max} \times 70\%$ over a test period of time.
2. test interval: 15 minutes
3. all main axes remain stationary during the test.
4. minimum machine operation time: 3 hours

Machine load type 2

1. test axis(axes) should be driven at rapid traverse between the end points (i.e. positions at each extreme of programmable travel).
2. test interval: 5 minutes
3. minimum machine operation time per each axis: one hour

Machine load type 3

1. thermal loading of a machine tool through a constant idle running speed of the main spindle of $n = n_{max} \times 70\%$ over a test period of time.
2. test interval: 15 minutes
3. all main axes operate on general contour feed rate: F100-F1000,
4. minimum machine operation time: 3 hours Thermal distortion of structure (due to spindle rotation)

The machine under test was operated with machine load type 1. According to the above mentioned draft British Standard, all axes remained stationary except the main spindle during the test. Contour tests were repeated every 15 minutes over a 3 hour period and the variation of the measurement centre of the contour motion were measured. Two different position tests were also carried out to evaluate the thermal inclination of the z axis.

Thermal drift of axis drives

The machine under test was operated with machine load type 2 and the tests performed as quickly as possible. The temperatures and deviation of the contour motion measured over a testing time of 1 hour, and the variations of the measurement centre and contouring radius were measured and investigated.

Thermally Induced Contouring Error

The machine under test was operated with machine load type 3 for 5 hours and the variations of the measurement certre and contouring radius were measured and investigated.

3. Evaluation of the Thermally Induced Error Test Results

Thermal distortion of structure and thermal drift of the drives were represented by means of the variations of the certre of the contour motion (eccentricity of circle centre), variation of the contouring radius (least square circle radius), respectively on the 'Basic profile test' plot results. Using the software which was developed for plotting of error variation against time, thermally induced errors from the different sources during contouring are shown in FIG. 28 to FIG. 32.

Thermal distortion of the structure

Figure 28B:
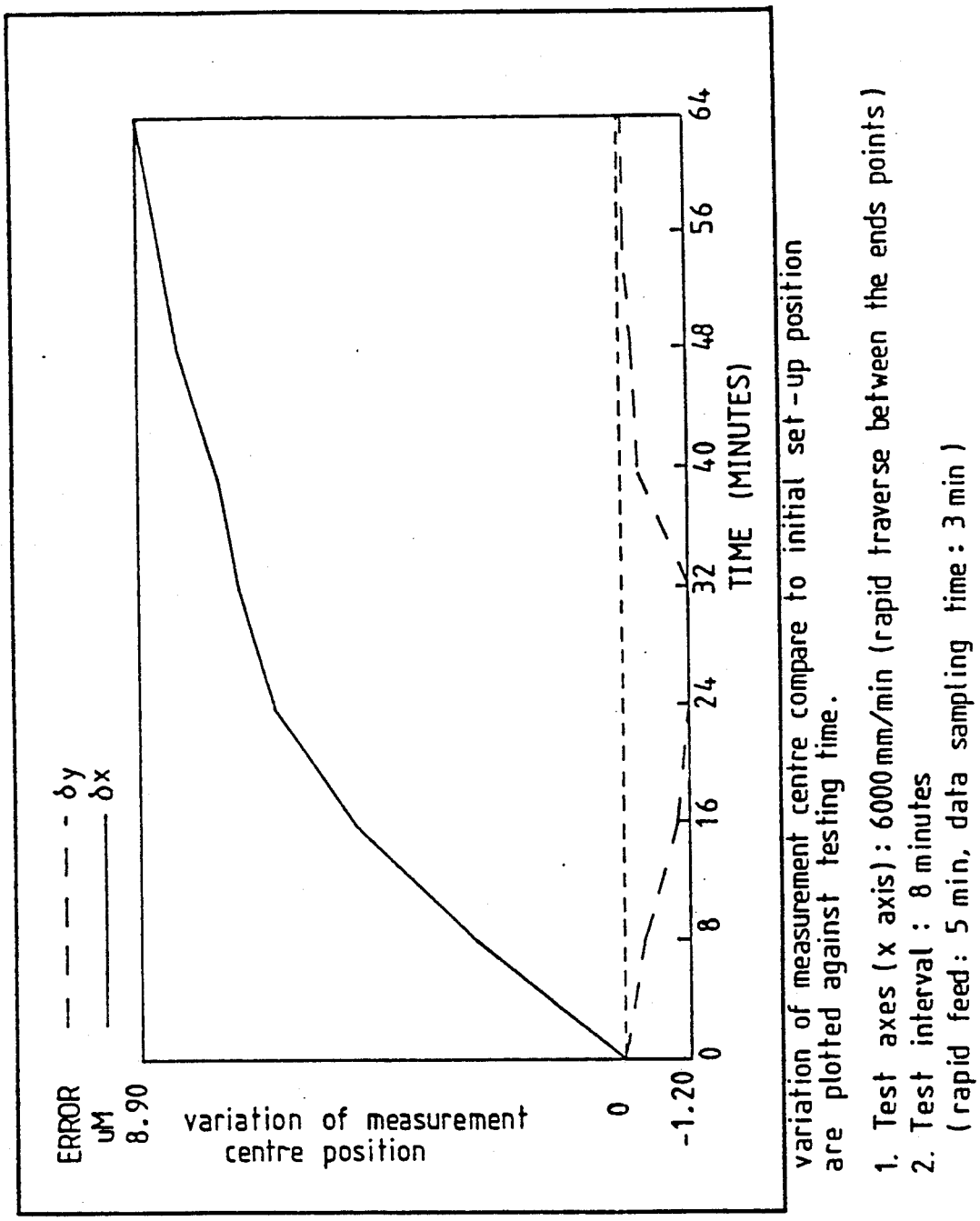
FIGS. 28(a) and (b) show the JP system test results of the thermal distortion of the structure of the Takisawa machining center.

The variations of the eccentricity values throughout the testing time were measured by the 'JP system' test, and variation, $\sigma x$ and $\sigma y$, in x, y directions, respectively, were plotted against the testing time. FIGS. 28(a) and (b) showed the JP system test results of the thermal distortion of the structure of the Takisawa machining centre. FIG. 27 showed that $\sigma x$ was negligible, but $\sigma y$ increased throughout testing time and a maximum value of 19 $\mu$m was obtained after 216 minutes of continuous spindle rotation. From the two position tests shown in FIG. 27, the thermal inclination of the z-axis can be detected. Test results showed the same thermal distortion tendency for both axes. The thermal inclination of the x axis was negligible; however, in the case of the y axis, a maximum thermal inclination of 8 $\mu$m/180 mm (9 arcsec) was detected.

Thermal drift of the axis drives

Thermal drift of the axis drives was checked by rapid feed motion in the x axis (6000 mm/m) for over an hour. During the rapid feed motion test, diameter variation in the x and y axis directions and the deviation of the measurement centre compare to the initial set-up position were obtained by the 'JP system' test. The thermal distortion $\sigma x$ and $\sigma y$ in the x, y directions were plotted against time. FIG. 28(a) and (b) showed the thermal drifts plot of the x and y drives of the Takisawa machining centre. As shown in FIG. 28(a) and (b), the thermal drift of the x axis is significant and the y axis drift is also considerable. The maximum drift error value of 18.7 $\mu$m was detected with about half its value for the corresponding centre position shift.

Thermally Induced Contouring Error

Figure 29:
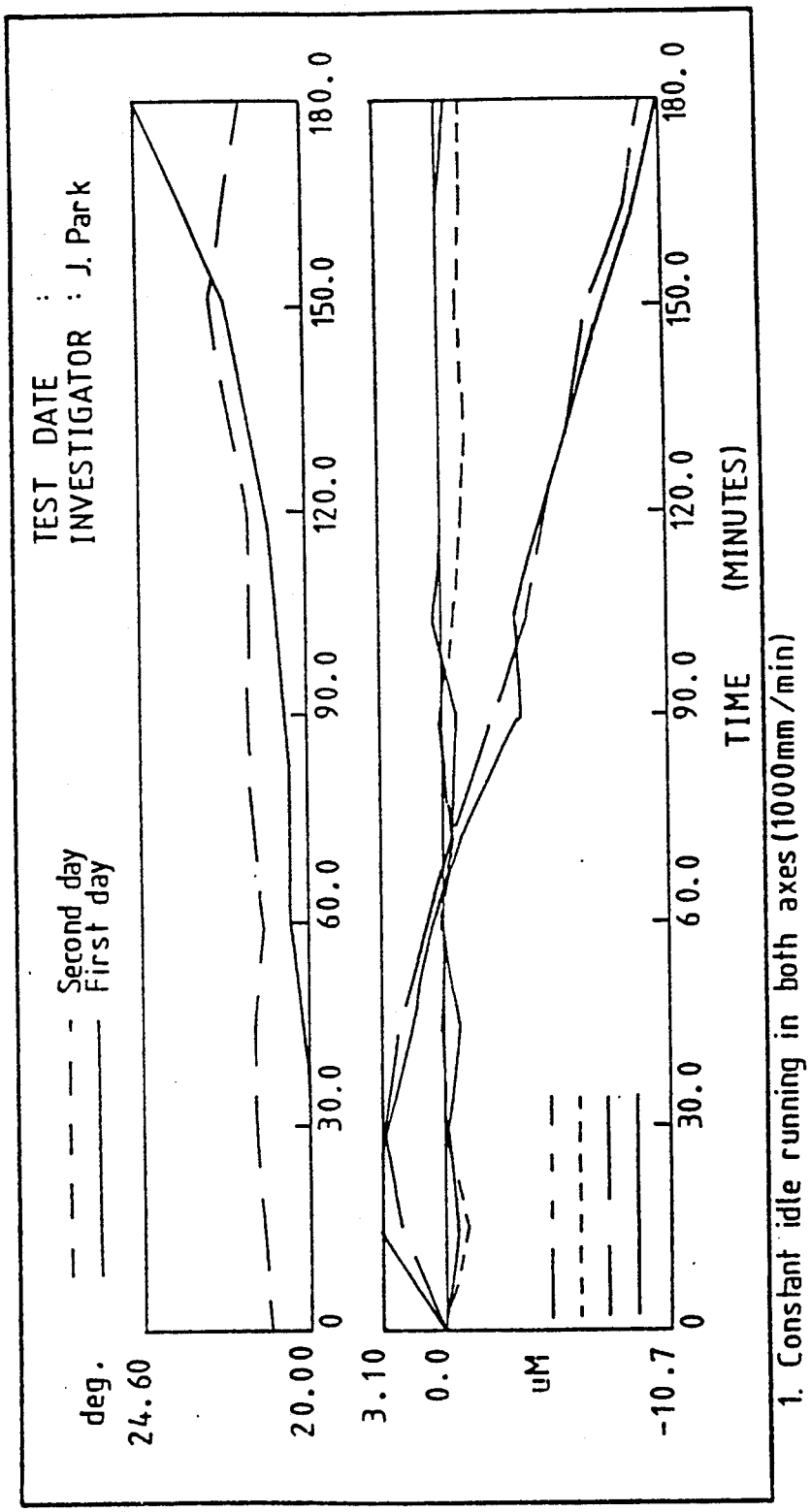
FIG. 29 shows test results of the thermal distortion of axis drive due to contour operation.

Using the least squares data and the eccentricity of the circle data obtained from each contour test, thermally induced machine tool error during N.C. contouring were measured and the results are represented as shown in FIG. 29. FIG. 29 shows the variation of the eccentricity values during the testing time. These results represents the repeatability of thermal distortion of the structure during contouring operations. Test results showed that the repeatability of the test was within a micron and also that the variations of $\sigma x$, $\sigma y$ are not dependent on the environmental temperature.

Figure 30:
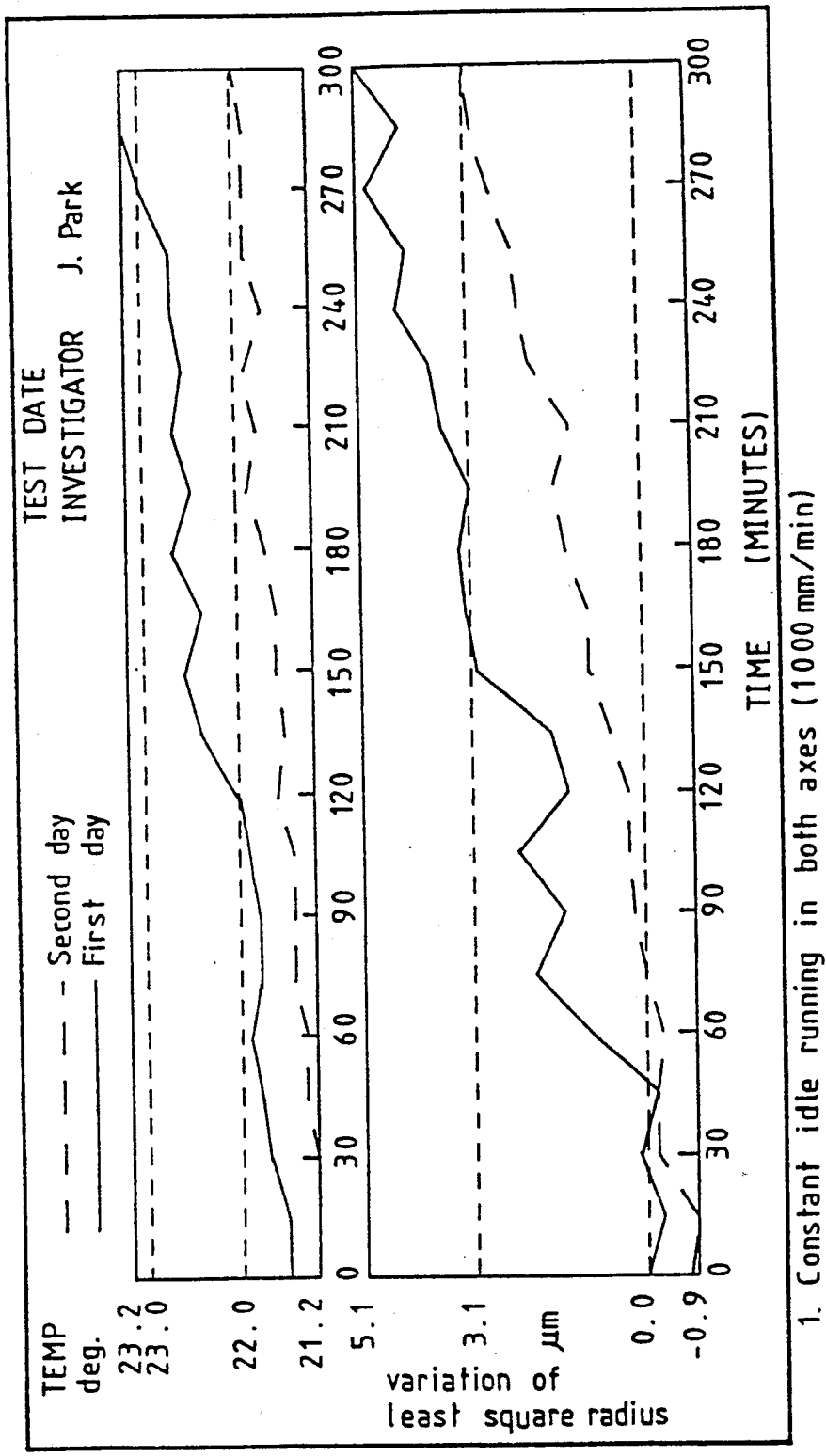
FIG. 30 shows the variation of the least square radius during test time.

FIG. 30 shows the variation of the least square radius during testing time. These results show the thermal drift of the axis drives due to continuous contouring operation as well as the influence of ambient temperature. The thermal errors from the environmental temperature effect was about 1.6 $\mu$m/degree and the value of drift of axis drives due to continuous contouring motion was about 2.3 m (5.1 $\mu$m$-1.6\times(23.2-21.5)$).

Figure 31:
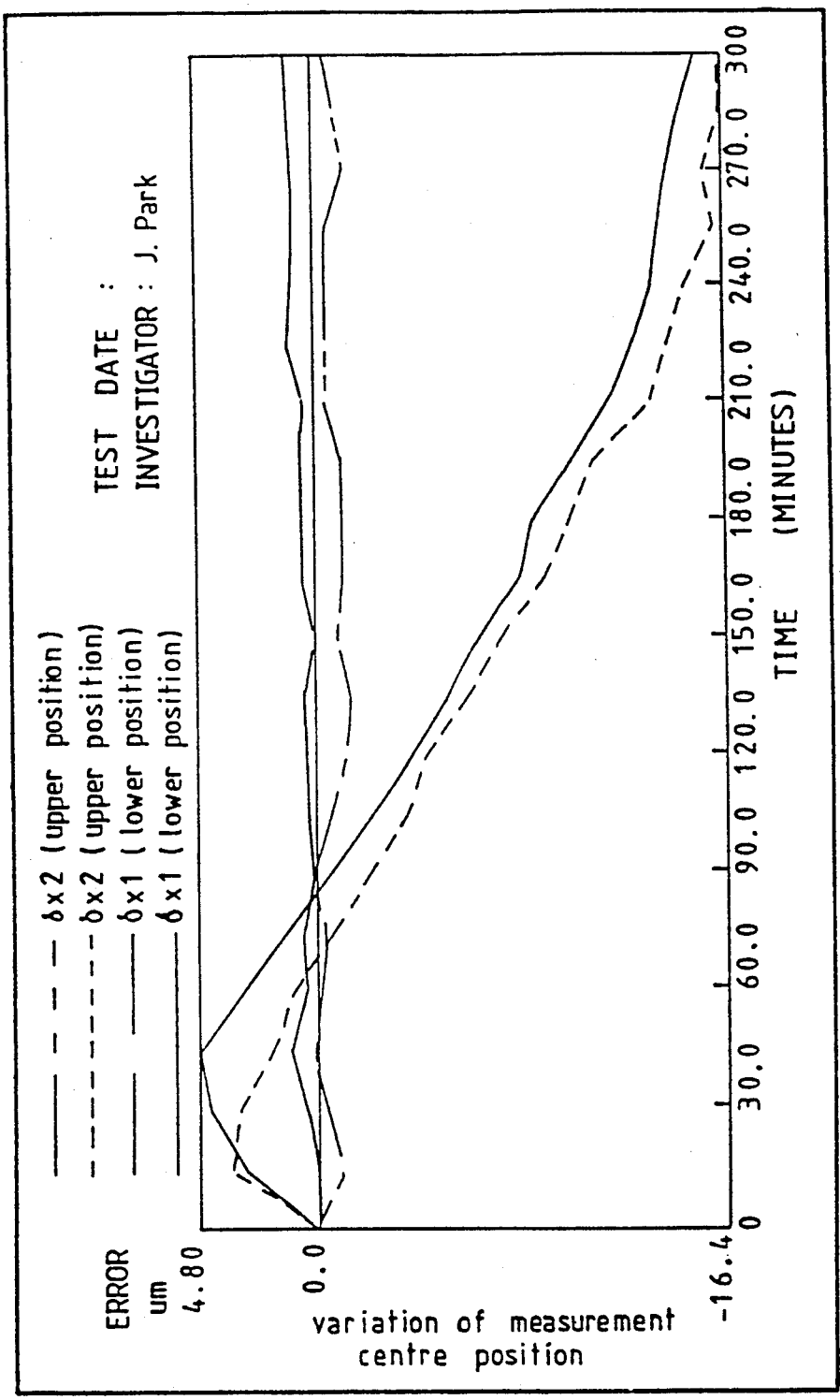
FIGS. 31 and 32 show the results on repeatability of thermal distortion, thermal drift of axis drives, thermal distortion in two different positions, and thermal inclination in z axis, due to contour operation, respectively.
Figure 32:
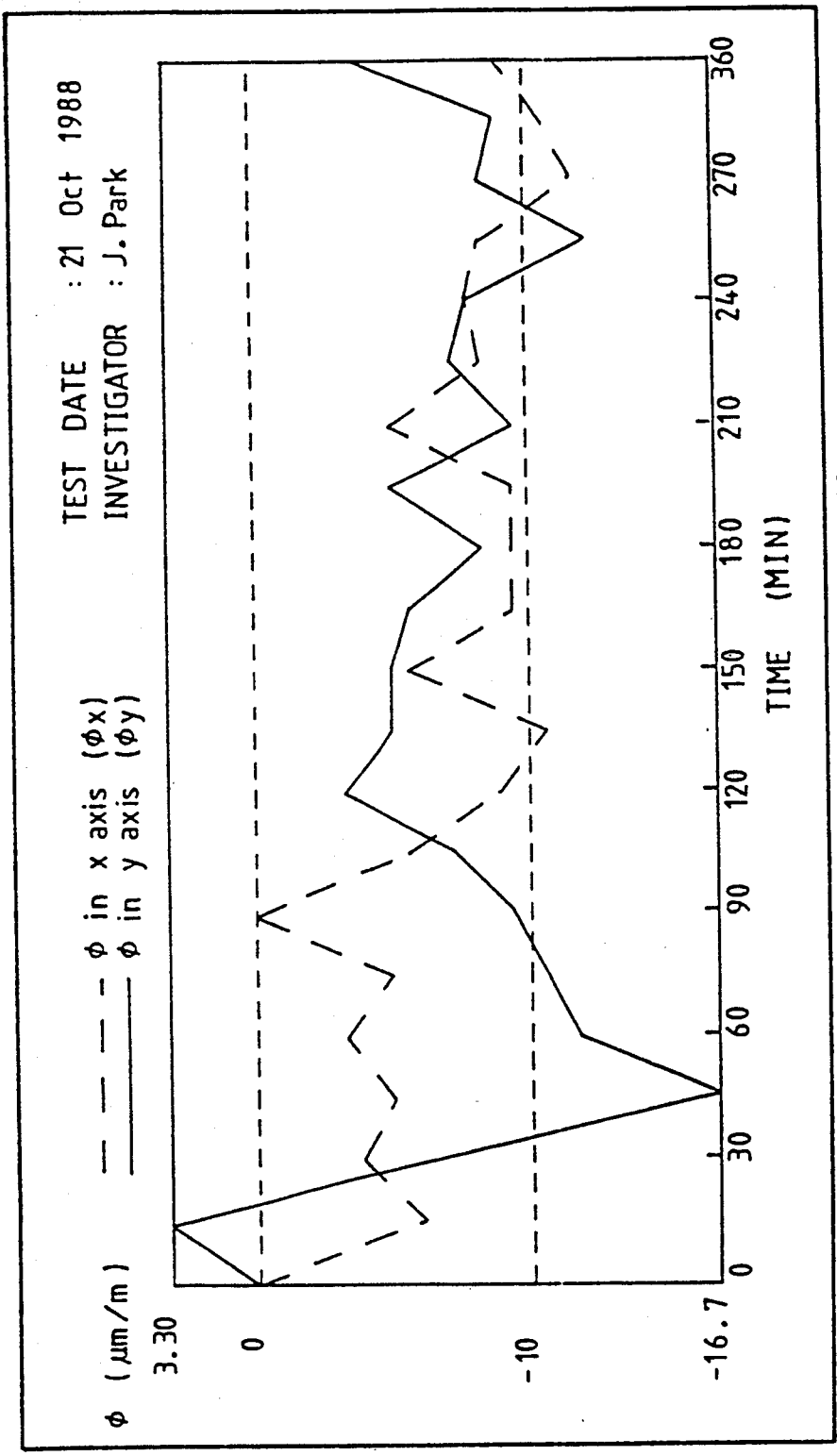

FIG. 31 shows the results for two different position (height) tests for the thermal distortion of the structure. Using these test results, thermal inclinations of the main spindle were calculated and the variation against time are plotted in FIG. 32. From this figure, a maximum angular error of 16.7 $\mu$m/m was detected.

What is claimed is:

1. A computer aided kinematic transducer link system for assessing the contouring capabilities of a machine tool on a working table, comprising:
    a first ball mounted on a spindle at an end of said machine tool and supported with a first ball holding support,
    a second ball mounted on a magnetic base on said working table and supported with a second ball holding support,
    a kinematic transducer link having single axis linear transducers supported between said first and second balls in a pseudo kinematic way, said kinematic transducer link being aligned by a spring loading onto a three point contact with said second ball at a workpiece position on said working table and a forked linear guide action on said first ball at a working position of said machine tool,
    a kinematic transducer link setting fixture for set-up of required set-up lengths of said kinematic transducer link, and
    electronic probes respectively mounted beside said first and second balls and within said kinematic transducer link for assessing the contouring capabilities of said machine tool during operation of said machine tool.

2. A system as claimed in claim 1 further comprising:
    a computer monitor,
    an A/D converter for receiving an analog output signal from said transducers and converting said analog output signal into a digital output signal, and
    a microcomputer responsive to said digital output signal for analyzing said digital output signal in terms of deviations from a nominal circle, said microcomputer including means for previewing said deviations with respect to programmed profiles, for analyzing the source of said deviations and for formatting the analyzed digital output signal for display on said computer monitor.

3. A system as claimed in claim 2 wherein said kinematic transducer link is made of carbon fiber.

4. A system as claimed in claim 3 wherein said electronic probes are linearly variable differential transformer (LVDT) probes.

5. A system as claimed in claim 1 wherein said first and second balls are mounted onto said first and second ball holding supports by a glue.

6. A system as claimed in claim 5 wherein the distance between a center of said first ball and a center of said second ball is calibrated against a laser interferometer system.

* * * * *